United States Patent
Furutake

(10) Patent No.: US 9,910,240 B2
(45) Date of Patent: Mar. 6, 2018

(54) LENS MODULE FOR IMAGING APPARATUS

(71) Applicant: DENSO CORPORATION, Kariya, Aichi-pref. (JP)

(72) Inventor: Yasuki Furutake, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 131 days.

(21) Appl. No.: 14/697,974

(22) Filed: Apr. 28, 2015

(65) Prior Publication Data

US 2015/0338602 A1    Nov. 26, 2015

(30) Foreign Application Priority Data

May 20, 2014 (JP) ................................ 2014-104142

(51) Int. Cl.
*G02B 7/02* (2006.01)
*G02B 13/00* (2006.01)
*G02B 13/16* (2006.01)

(52) U.S. Cl.
CPC ............ *G02B 7/028* (2013.01); *G02B 7/021* (2013.01); *G02B 7/025* (2013.01); *G02B 13/003* (2013.01); *G02B 13/16* (2013.01)

(58) Field of Classification Search
CPC ........ G02B 7/028; G02B 7/021; G02B 7/025; G02B 7/003; G02B 7/16; G02B 13/003; G02B 13/16; G02B 6/0218; G02B 7/08; G02B 6/02209; G02B 6/29398; G02B 6/022; G02B 6/4239; G02B 6/02204; G02B 6/1203; H01S 3/1028; G02F 2203/60

USPC .......................................... 359/793, 819, 820
See application file for complete search history.

(56) References Cited

U.S. PATENT DOCUMENTS

| 6,188,841 B1 | 2/2001 | Kamata |
| 2011/0013070 A1 | 1/2011 | Hirao et al. |
| 2012/0147489 A1* | 6/2012 | Matsuoka .............. G02B 7/021 359/819 |
| 2013/0163104 A1* | 6/2013 | Aburmad ............... G02B 7/028 359/820 |
| 2015/0029384 A1* | 1/2015 | Luan ................. H01L 27/14687 348/340 |

FOREIGN PATENT DOCUMENTS

| JP | S57-208518 A | 12/1982 |
| JP | S62-147413 A | 7/1987 |
| JP | H07209609 A | 8/1995 |
| JP | H11-337798 A | 12/1999 |

(Continued)

*Primary Examiner* — Bumsuk Won
*Assistant Examiner* — Collin X Beatty
(74) *Attorney, Agent, or Firm* — Harness, Dickey & Pierce, P.L.C.

(57) ABSTRACT

A lens module for an imaging apparatus includes a lens assembly including a first lens and a second lens, a holder holding the lens assembly, a first adhesive that adheres the first lens to the holder, an elastic modulus of the first adhesive being larger than an elastic modulus of the first lens, and a second adhesive that adheres the first lens to the holder, an elastic modulus of the second adhesive being smaller than the elastic modulus of the first lens. The first adhesive is interposed between one surface of the first lens and the holder and the second adhesive is interposed between the other surface of the first lens and the holder.

6 Claims, 17 Drawing Sheets

HIGH TEMPERATURE (T2)

LOW TEMPERATURE (T3)

(56) References Cited

FOREIGN PATENT DOCUMENTS

| | | |
|---|---|---|
| JP | 2006-113176 | 4/2006 |
| JP | 2009-244430 | 10/2009 |
| WO | WO 2009/101928 | 8/2009 |

\* cited by examiner

NORMAL TEMPERATURE (T1)

HIGH TEMPERATURE (T2)

LOW TEMPERATURE (T3)

NORMAL TEMPERATURE (T1)

HIGH TEMPERATURE (T2)

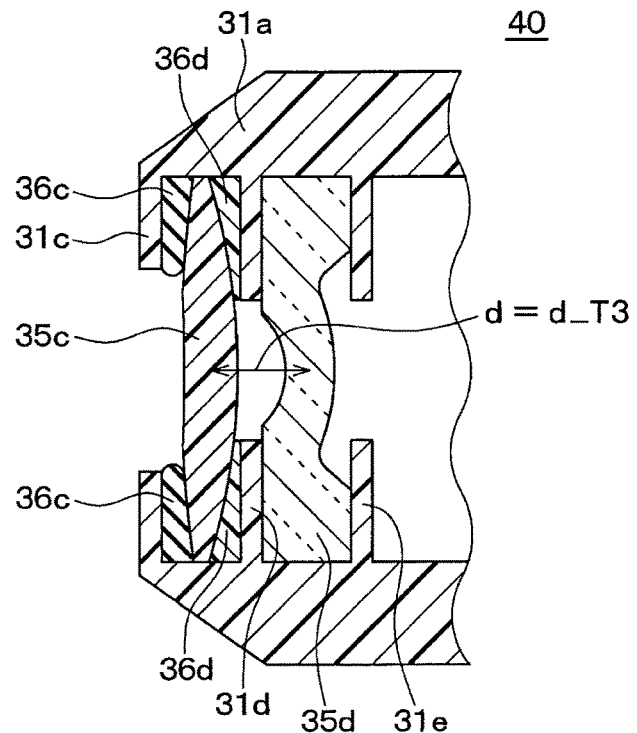
FIG. 8C LOW TEMPERATURE (T3)
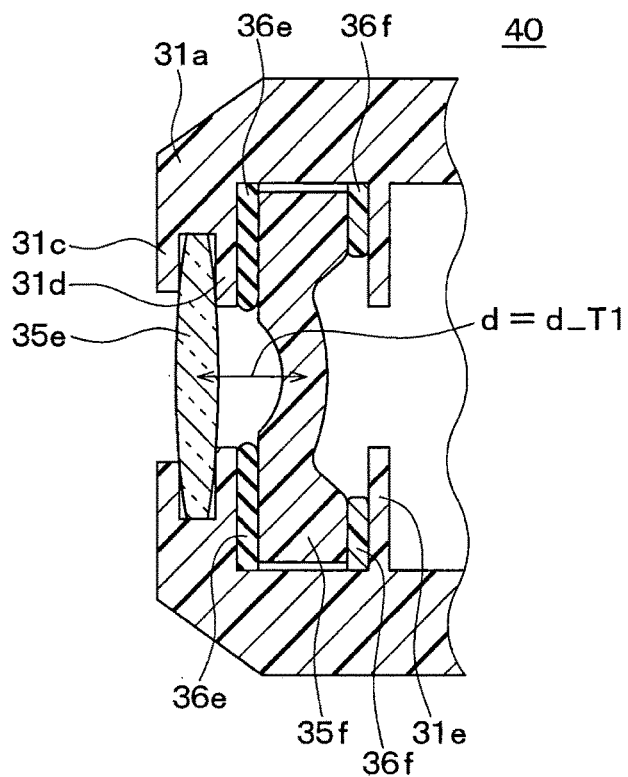
FIG. 9A NORMAL TEMPERATURE (T1)

HIGH TEMPERATURE (T2)

LOW TEMPERATURE (T3)

NORMAL TEMPERATURE (T1)

HIGH TEMPERATURE (T2)

FIG.10C  LOW TEMPERATURE (T3)
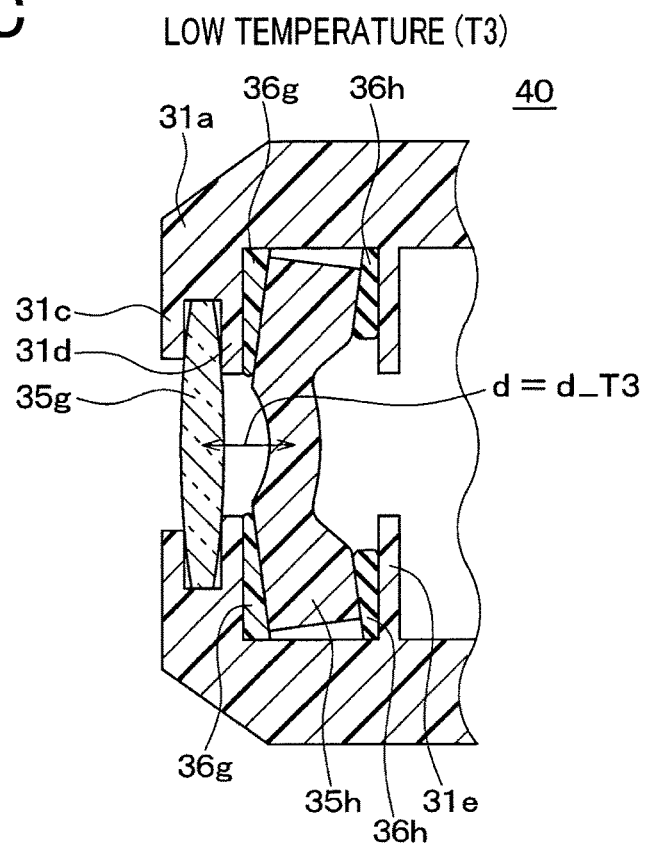
FIG.11A  NORMAL TEMPERATURE (T1)
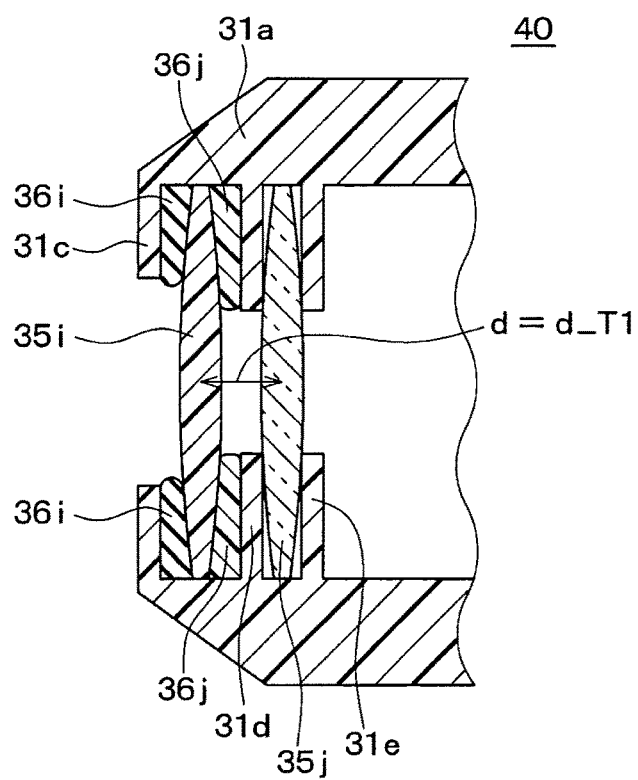

HIGH TEMPERATURE (T2)

LOW TEMPERATURE (T3)

NORMAL TEMPERATURE (T1)

HIGH TEMPERATURE (T2)

FIG.12C    LOW TEMPERATURE (T3)
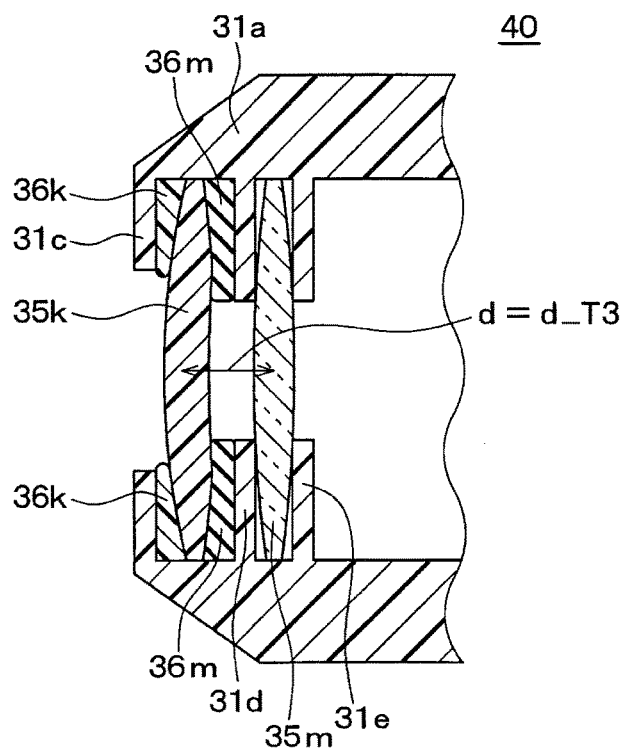
FIG.13A    NORMAL TEMPERATURE (T1)
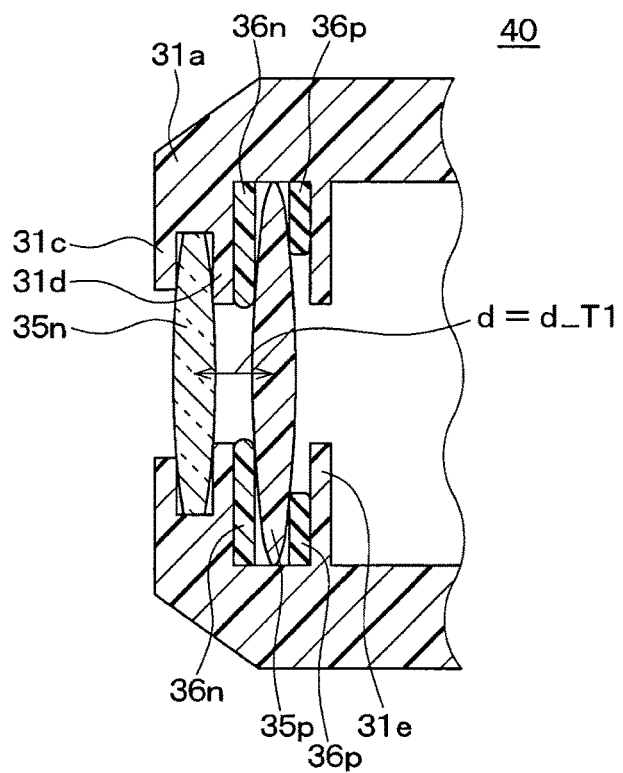

NORMAL TEMPERATURE (T1)

HIGH TEMPERATURE (T2)

LOW TEMPERATURE (T3)

FIG.15

| EMBODIMENT | FIGURE | OBJECT-SIDE LENS | IMAGE-SIDE LENS | CHANGE OF FOCAL LENGTH f DUE TO REFRACTIVE INDEX CHANGE AT HIGH TEMPERATURE | f1+f2-d | CHANGE OF INTER-LENS DISTANCE d AT HIGH TEMPERATURE | HIGHER ELASTIC MODULUS (HARDER) ADHESIVE |
|---|---|---|---|---|---|---|---|
| 1 | 7A-7C | CONVEX (DEFORMATION) | CONCAVE | DECREASE | NEGATIVE | DECREASE | OBJECT-SIDE |
| 2 | 8A-8C | CONVEX (DEFORMATION) | CONCAVE | INCREASE | NEGATIVE | INCREASE | IMAGE-SIDE |
| 3 | 9A-9C | CONVEX | CONCAVE (DEFORMATION) | DECREASE | NEGATIVE | DECREASE | IMAGE-SIDE |
| 4 | 10A-10C | CONVEX | CONCAVE (DEFORMATION) | INCREASE | NEGATIVE | INCREASE | OBJECT-SIDE |
| 5 | 11A-11C | CONVEX (DEFORMATION) | CONCAVE | DECREASE | POSITIVE | INCREASE | IMAGE-SIDE |
| 6 | 12A-12C | CONVEX (DEFORMATION) | CONCAVE | INCREASE | POSITIVE | DECREASE | OBJECT-SIDE |
| 7 | 13A-13C | CONVEX | CONCAVE (DEFORMATION) | DECREASE | POSITIVE | INCREASE | OBJECT-SIDE |
| 8 | 14A-14C | CONVEX | CONCAVE (DEFORMATION) | INCREASE | POSITIVE | DECREASE | IMAGE-SIDE | ved a technique that enables compensating change of the refractive indices of lenses of a lens module for an imaging apparatus due to change of the temperature of the lenses without increasing the parts count of the imaging apparatus.

LENS MODULE FOR IMAGING APPARATUS

This application claims priority to Japanese Patent Application No. 2014-104142 filed on May 20, 2014, the entire contents of which are hereby incorporated by reference.

BACKGROUND OF THE INVENTION

1. Field of the Invention

The present invention relates to a lens module for an imaging apparatus.

2. Description of Related Art

The focal length of a lens of an imaging apparatus varies depending on the ambient temperature because its refractive index changes with its temperature, causing the performance of the imaging apparatus to be lowered.

To deal with such a problem, PCT International Publication No. WO 2009/101928 describes a technique in which a lens is mounted on the surface of a lens-holding plate, the linear expansion coefficient of the lens being larger than that of the lens-holding plate so that the refractive index change due to the temperature change of the lens is compensated utilizing the difference in linear expansion coefficient between the lens-holding plate and the lens.

However, the technique has a problem that the lens-holding plate is required as an additional member to compensate the refractive index change of the lens, causing the parts count of the imaging apparatus to increase.

SUMMARY

An exemplary embodiment provides a lens module for an imaging apparatus including:

a lens assembly including a first lens and a second lens;

a holder holding the lens assembly;

a first adhesive that adheres the first lens to the holder, an elastic modulus of the first adhesive being larger than an elastic modulus of the first lens; and a second adhesive that adheres the first lens to the holder, an elastic modulus of the second adhesive being smaller than the elastic modulus of the first lens; wherein the first adhesive is interposed between one surface of the first lens and the holder and the second adhesive is interposed between the other surface of the first lens and the holder, such that effect of a change of refractive indices of the first and second lenses due to change of temperature of the lens assembly on a focal length of the lens assembly and effect of deformation of the first lens due to the change of the temperature of the lens assembly on the focal length of the lens assembly cancel with each other.

According to the exemplary embodiment, there is pro-

Other advantages and features of the invention will become apparent from the following description including the drawings and claims.

BRIEF DESCRIPTION OF THE DRAWINGS

In the accompanying drawings:

FIG. 8C is an enlarged view of the lens section of the camera module according to the second embodiment at the low temperature;

FIG. 9A is an enlarged view of a lens section of a camera module according to a third embodiment at the normal temperature;

FIG. 10C is an enlarged view of the lens section of the camera module according to the fourth embodiment at the low temperature;

FIG. 11A is an enlarged view of a lens section of a camera module according to a fifth embodiment at the normal temperature;

FIG. 12C is an enlarged view of the lens section of the camera module according to the sixth embodiment at the low temperature;

FIG. 13A is an enlarged view of a lens section of a camera module according to a seventh embodiment at the normal temperature;

FIG. 15 is a diagram showing functional summaries of the first to eighth embodiments.

PREFERRED EMBODIMENTS OF THE INVENTION

First Embodiment

Figure 1:
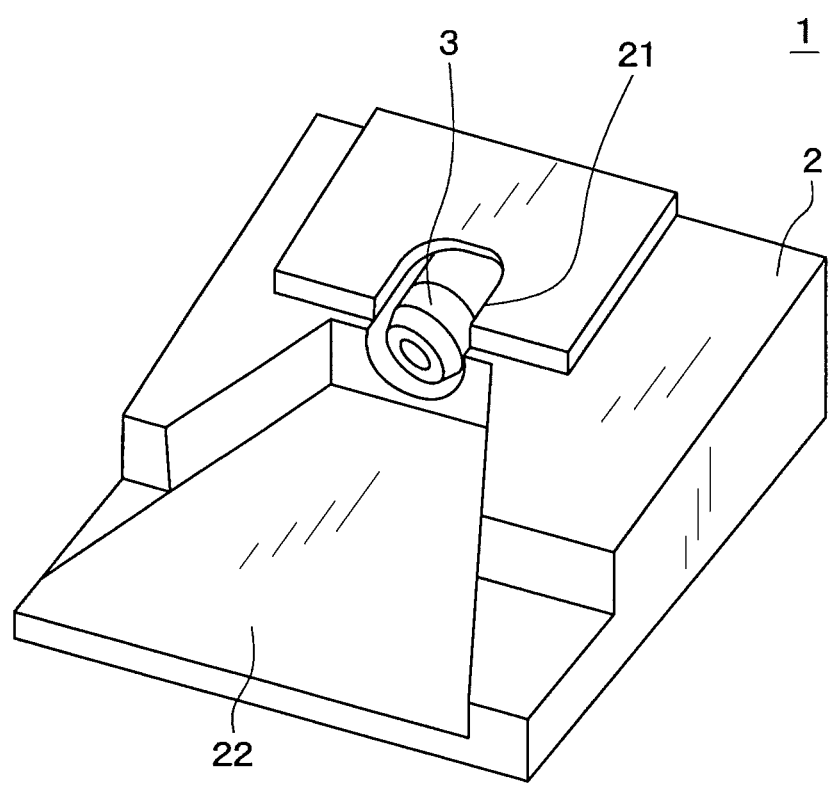
FIG. 1 is a perspective view of an imaging apparatus 1 including a camera module 3 according to a first embodiment of the invention.

FIG. 1 is a perspective view of an imaging apparatus 1 including a camera module 3 according to a first embodiment of the invention. The imaging apparatus 1 is mounted on a vehicle to take images ahead of the vehicle, perform various analysis processes (an image recognition process and so on) on the taken images, and send signals indicating results of the analysis processes to other ECUs (a headlight control ECU, a lane deviation detection ECU and so on).

As shown in FIG. 1, the imaging apparatus 1 includes a housing 2 and the camera module 3. The camera module 3 is partially exposed from an opening 21 formed in the vicinity of the center portion of the upper surface of the housing 2. The camera module 3 is for taking images ahead of the vehicle.

The imaging apparatus 1 is mounted on the windshield (front glass) of the vehicle at a position which is within the cabin and in the vicinity of a rear-view mirror of the vehicle. At this fitting position, the ambient temperature of the imaging apparatus 1 may fall to near −40° C. and rise to near 100° C. Accordingly, the imaging apparatus 1 is required to operate normally in the operation temperature range from −40° C. to 100° C.

Figure 2:
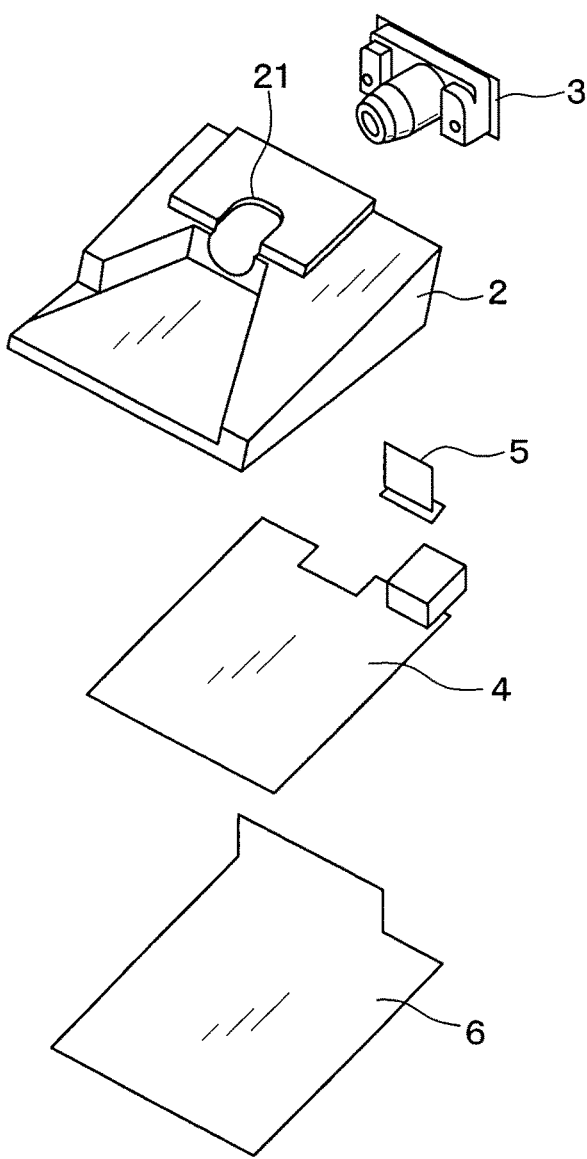
FIG. 2 is a parts-exploded view of the imaging apparatus 1.
Figure 3:
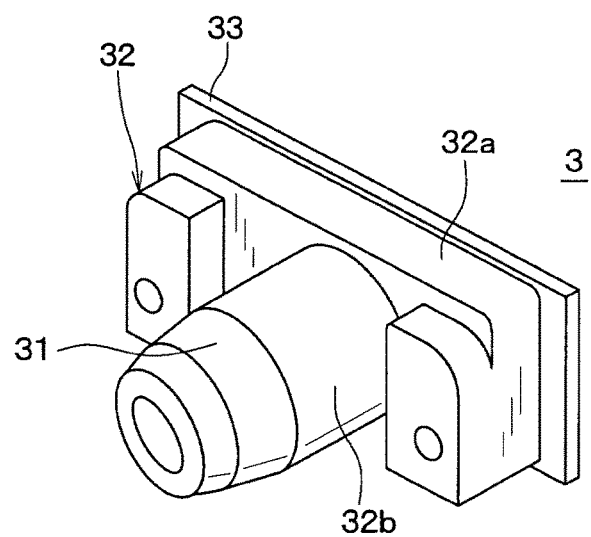
FIG. 3 is a perspective view of a camera module 3 included in the imaging apparatus 1.
Figure 4:
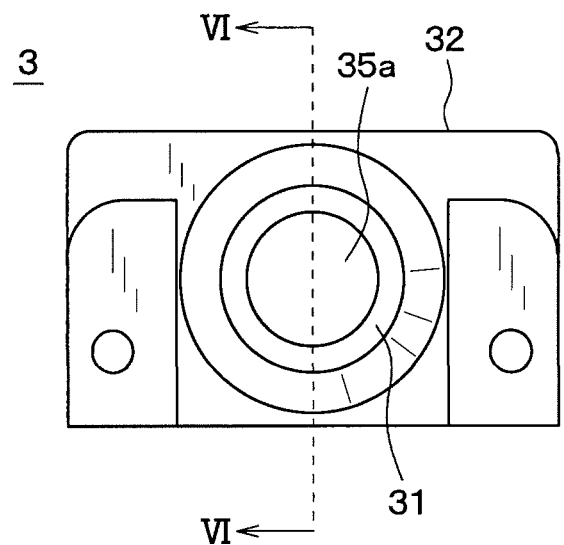
FIG. 4 is a front view of the camera module 3.
Figure 5:
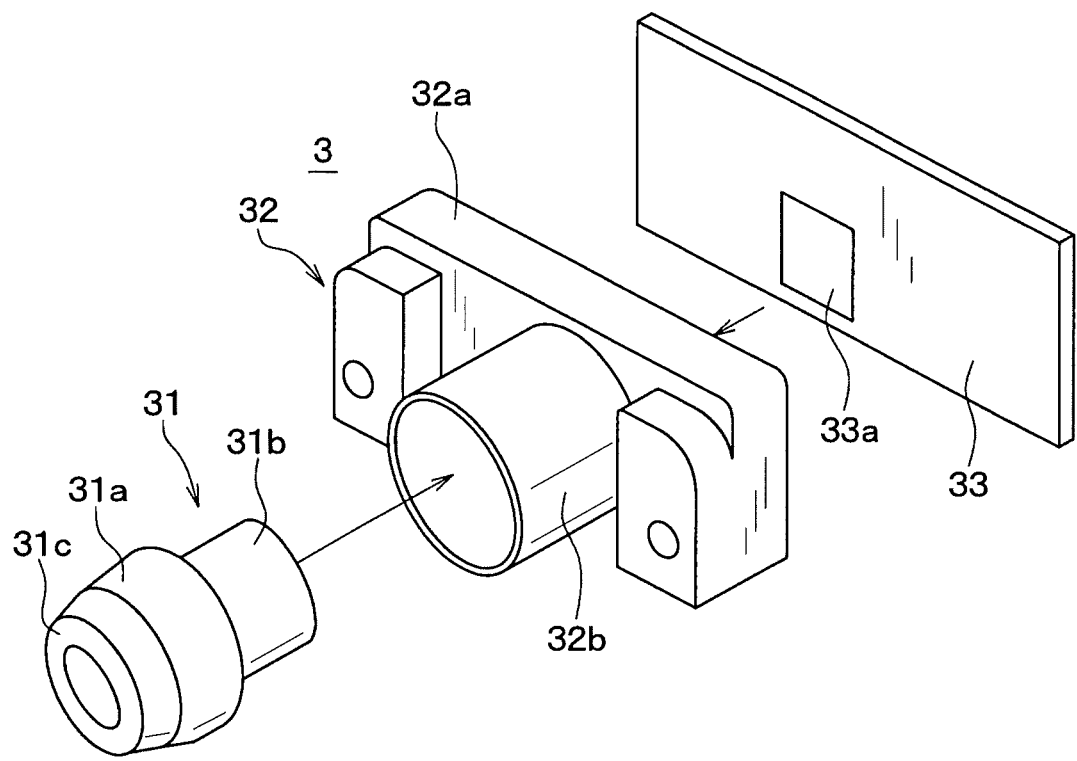
FIG. 5 is a parts-exploded view of the camera module 3.

Next, the structure of the imaging apparatus 1 is described in detail. As shown in FIG. 2, the imaging apparatus 1 includes the housing 2 made of metal, the camera module 3, a control circuit board 4, an electric connection cable 5, and a lower cover 6.

As described in the foregoing, the opening 21 is formed in the vicinity of the center portion of the upper surface of the housing 2. The camera module 3 is mounted on the housing 2 so as to be partially exposed from the opening 21. The control circuit board 4 and the electric connection cable 5 are disposed below the camera module 3. The cover 6 is fixed to the housing 2 below the control circuit board 4 and the electric connection cable 5. The opening 21 is located at a position opposite to the control circuit board 4.

The housing 2 is formed with a depression 22 so as not to obstruct the imaging range of the camera module 3. Also, the opening 21 is formed so that the housing 2 does not obstruct the imaging range of the camera module 3.

Next, the structure of the camera module 3 is described in detail with reference to FIGS. 3 to 7C. The camera module 3 includes a first holder 31, a second holder 32, a camera circuit board 33, an object-side lens 35a, an image-side lens 35b, an object-side adhesive 36a and an image-side adhesive 36b.

The first holder 31, the object-side lens 35a, the image-side lens 35b, the object-side adhesive 36a and the image-side adhesive 36b constitute a lens module 40. In the first embodiment, the object-side lens 35a corresponds to the first lens, the image-side lens 35b corresponds to the second lens, the object-side adhesive 36a corresponds to the first adhesive and the image-side adhesive 36b corresponds to the second adhesive.

The first holder 31 is a resin member formed in a cylindrical shape housing therein an optical system for taking an image ahead of the vehicle. The first holder 31 includes a distal end part 31a, a barrel part 31b, a first inner flange 31c, a second inner flange 31d, a third inner flange 31e, and houses therein the object-side lens 35a and the image-side lens 35b as the optical system.

Figure 6:
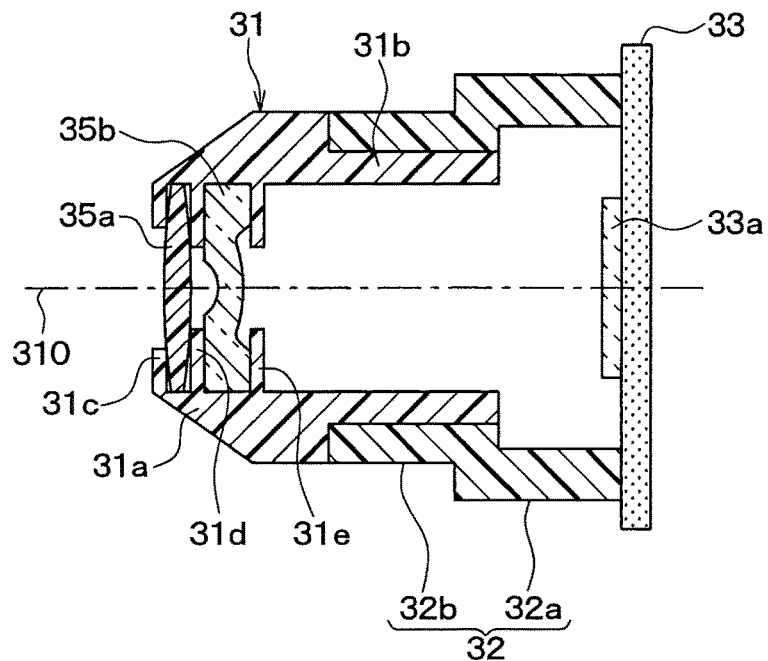
FIG. 6 is a cross-sectional view of FIG. 5 taken along line VI-VI.

The distal end part 31a is a member formed in a cylindrical shape whose diameter is reduced toward the distal end side (the left side in FIG. 6). The barrel part 31 is a member formed in a cylindrical shape whose inner diameter and outer diameter are both approximately constant. The distal end (the left end side in FIG. 6) of the barrel part 31 is integrally connected to the tail end of the distal end part 31a. The distal end part 31a and the barrel part 31b are disposed coaxially with the optical axis 310.

Each of the first to third inner flanges 31c, 31d and 31b is a member which is formed integrally with the distal end part 31a so as to have a shape of a perforated disk. These inner flanges 31c to 31e are arranged in the direction of the optical axis 310.

The second holder 32 is a member which houses therein the first holder 32, and to which the camera circuit board is screw-fixed. The second holder is made mainly of resin. The second holder 32 includes a holder base part 32a to which the camera circuit board 33 is screw-fixed, and a holder cylindrical part 32b which extends from the holder base part 32a in the direction of the optical axis 310 and houses therein the first holder 31. The holder base part 32a and the holder cylindrical part 32b are formed integrally with each other.

The camera circuit board, on which a solid imaging element 33a such as a CMOS image sensor is mounted, is fixed to the rear end surface of the second holder 32. The solid imaging element 33a is disposed on the optical axis 310 which is common to the lenses 35a and 35b within the first holder 31 in a state where the first holder is fixed to the second holder 32 and the camera circuit board 33 is fixed to the second holder 32.

The light incident on the lens object-side lens 35a passes through the image-side lens 35a and the image-side lens 35b, and forms an image on the solid imaging element 33. The solid imaging element 33a outputs a signal representing the image. The opening 21 of the housing 2 is located at a position opposite to the camera substrate 33.

The electric connection cable 5 shown in FIG. 2, which may be a flexible printed circuit board, is for connection between the solid imaging element 33a and other circuits mounted on the camera circuit board 33 and circuits mounted on the control circuit board 4. The circuits mounted on the control circuit board 4 include a detection section for performing the foregoing analysis processes and so on.

Next, the object-side lens 35a and the image-side lens 35b are explained in detail below. In this embodiment, the object-side lens 35a is a lens made of resin, and the image-side lens 35b is a lens made of glass.

These two lenses 35a and 35b constitute a lens assembly. The image-side lens 35b is disposed closer to the image forming side or the side of the solid imaging element 33a than the object-side lens 35a is.

Figure 7A:
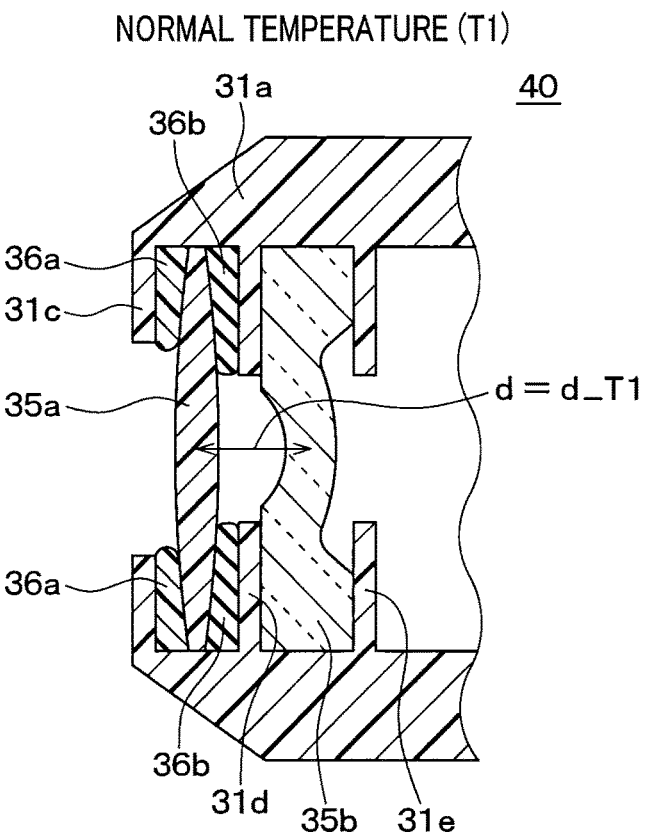
FIG. 7A is an enlarged view of a lens section of the camera module 3 according to the first embodiment at normal temperature.

Here, the structure for mounting the object-side lens 35a and the image-side lens 35b on the first holder 31 is explained with reference to FIG. 7A to 7C. The object-side lens 35a is housed in the first holder 31 with its peripheral portion being sandwiched between the first inner flange 31c and the second inner flange 31d. The image-side lens 35b is housed in the first holder 31 with its periphery being sandwiched between the second inner flange 31c and the third inner flange 31e.

The object-side adhesive 36a is interposed between the peripheral portion of the surface on the object side (the left side in FIGS. 7A to 7C) of the object-side lens 35a and the first inner flange 31c to cause the object-side lens 35a to adhere to the first inner flange 31c. The image-side adhesive 36b is interposed between the peripheral portion of the surface on the image forming side (the right side in FIGS. 7A to 7C) of the object-side lens 35a and the second inner flange 31d to cause the object-side lens 35a to adhere to the second inner flange 31d.

The object-side adhesive 36a may be an epoxy resin adhesive, if the elastic modulus (Young's modulus, for example) of the epoxy resin adhesive is larger than that of the object-side lens 35a. The object-side adhesives 36a may be an adhesive other than an epoxy resin adhesive, but its elastic modulus has to be larger than that of the object-side lens 35a. Since the elastic modulus of the object-side adhesive 36a is larger than that of the object-side lens 35a, the linear expansion coefficient of the object-side adhesive 36a is smaller than that of the object-side lens 35a.

The image-side adhesive 36b may be a silicone rubber adhesive, if the elastic modulus of the silicone rubber adhesive is smaller than that of the object-side lens 35a. The image-side adhesives 36b may be an adhesive other than a silicone rubber adhesive, but its elastic modulus has to be smaller than that of the object-side lens 35a. Since the elastic modulus of the image-side adhesive 36b is smaller than that of the object-side lens 35a, the linear expansion coefficient of the image-side adhesive 36b is larger than that of the object-side lens 35a.

In this way, the object-side lens 35a is adhered to the first inner flange 31c at its surface on the object side with the object-side adhesive 36a, and adhered to the second inner flange 31d at its surface on the image side (on the side of the solid imaging element 33a) with the image-side adhesive 36b.

For the image-side lens 35b, the adhesive interposed between the peripheral portion of the surface on the object side and the second inner flange 31d and the adhesive interposed between the peripheral portion of the surface on the image side and the third inner flange 31e are the same as each other in material and elastic modulus.

As explained above, the image-side lens 35b is adhered to the second inner flange 31d with the adhesive at the surface on the object side, and adhered to the third inner flange 31e at the surface on the image side with the same adhesive.

Next, the optical characteristics of the object-side lens 35a and the image-side lens 35b are explained. When the focal length of the object-side lens 35a is f1, the focal length of the image-side lens 35b is f2, and the distance between the object-side lens 35a and the image-side lens 35b (referred to as the "inter-lens distance" hereinafter) is d, the focal length f of the lens assembly is given by the following equation.

$$f = f1 \times f2 / (f1 + f2 - d)$$

In this embodiment, the value of f1×f2 is negative. This is because, the focal length f1 is positive because the object-side lens 35a is a convex lens, and the focal length f2 is negative because the image-side lens 35b is a concave lens. The focal lengths f1 and f2 vary depending on the temperatures of the lenses 35a and 35b because the refractive indices of the lenses 35a and 35b vary depending on the temperatures of the lenses 35a and 35b. However, the relationship of f1×f2<0 always holds within the foregoing operation temperature range. Further, the value of (f1+f2−d) is always negative within the operation temperature range.

Therefore, the focal length f of the lens assembly constituted of the lenses 35a and 35b is positive within the operation temperature range.

The focal point of the lens assembly is adjusted in advance so as to coincide with the position of the solid imaging element 33a when the temperature of the object-side lens 35a and the image-side lens 35b is equal to a predetermined normal temperature T1 (20° C., for example). Here, it is assumed that the inter-lens distance d is d_T1 when the temperature of the lenses 35a and 35b is T1.

When the temperature of the object-side lens 35a and the image-side lens 35b increases from T1, it occurs as follows. In this case, the refractive indices of the lenses 35a and 35b vary with the increase of the temperature to reduce the focal length f of the lens assembly. This is explained below more specifically.

It is assumed that the focal length f of the lens assembly constituted of the lenses 35a and 35b is f_T1 when their temperature is equal to the normal temperature T1, and the focal lengths f1 and f2 are f1_T2 and f2_T2, respectively, when their temperature has increased to a high temperature T2 (100° C., for example). In this case, the relationship of f_T1>f1_T2×f2_T2/(f1_T2+f2_T2−d_T1) holds. Incidentally, since the denominator of the right side of this inequality is equal to the inter-lens distance d at the normal temperature of T1, the value of the right side is different from the focal length f of the lens assembly at the high temperature T2. That is, if the values of the inter-lens distance d at the normal temperature T1 and at the high temperature T2 are the same as each other, the focal length f of the lens assembly becomes shorter as a result of the variation of the refractive indices of the lenses 35a and 35b.

Generally, the refractive index of a lens is roughly a linear function of the temperature within its operation temperature range. Accordingly, the above holds regardless of the value of T2 as long as T2 is within the operation temperature range. When the temperature of the lenses 35a and 35b falls below the normal temperature T1 to a low temperature T3, the opposite to the above holds. T3 may be −40° C., for example.

That is, in this case, the refractive indices of the lenses 35a and 35b vary with the decrease of the temperature to increase the focal length f of the lens assembly. When it is assumed that the focal length f1 is f1_T3 and the focal length f2 is f2_T3 after the temperature of the lenses 35a and 35b has fallen to the low temperature T3, the relationship of f_T1<f1_T3×f3_T3/(f1_T3+f2_T3−d_T1) holds. That is, if the values of the inter-lens distance d at the normal temperature T1 and at the low temperature T3 are the same as each other, the focal length f of the lens assembly becomes longer as a result of variation of the refractive indices of the lenses 35a and 35b.

The variation of the refractive indices and the variation of the focal length as described above are possible for the lens assembly constituted of the lenses 35a and 35b when the following conditions (A) and (B) are both satisfied, for example.

(A) The amount of the variation of the refractive index and the amount of the resultant variation of the focal length in the object-side lens 35a are far larger than those in the image-side lens 35b.

(B) The focal length f1 decreases due to variation of the refractive index as the temperature increases, and increases due to variation of the refractive index as the temperature decreases. As a resin lens satisfying the condition (B), there is known a lens made of cycloolefin polymer.

Next, variation of the focal length f of the lens assembly constituted of the lenses 35a and 35b with the temperature change is explained in detail. As shown in FIG. 7A, the inter-lens distance d is d_T1 when the lenses 35a and 35b are at the normal temperature T1. As explained in the foregoing, the focal point of the lens assembly coincides with the position of the solid imaging element 33a at this time.

Figure 7B:
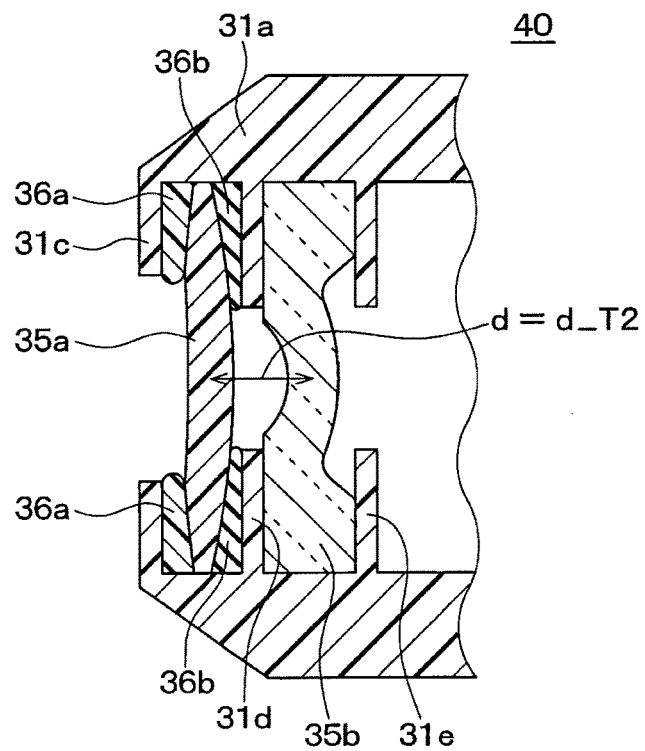
FIG. 7B is an enlarged view of the lens section according to the first embodiment at high temperature.

As shown in FIG. 7B, when the temperature of the lens assembly increases from the normal temperature T1 to the high temperature T2, the object-side lens 35a is deformed. The elastic modulus of the object-side adhesive 36a is higher than that of the object-side lens 35a. That is, the object-side adhesive 36a is harder than the object-side lens 35a. The elastic modulus of the image-side adhesive 36b is lower than that of the object-side lens 35a. That is, the image-side adhesive 36b is softer than the object-side lens 35a. Accordingly, the amount of deformation due to the temperature increase (thermal expansion) of the object-side lens 35a at the surface in contact with the image-side adhesive 36b and its vicinity is larger than that at the surface in contact with the object-side adhesive 36a and its vicinity. That is, the object-side lens 35a is deformed more freely at the side of the image-side adhesive 36b than at the side of the object-side adhesive 36a.

As a result, since the object-side lens 35a is warped, the object-side lens 35a moves in the direction for its center portion to approach the image-side lens 35b. Hence, the inter-lens distance d decreases from d_T1 to d_T2. In this way, the inter-lens distance d decreases with the increase of the temperature of the lenses 35a and 35b.

Figure 7C:
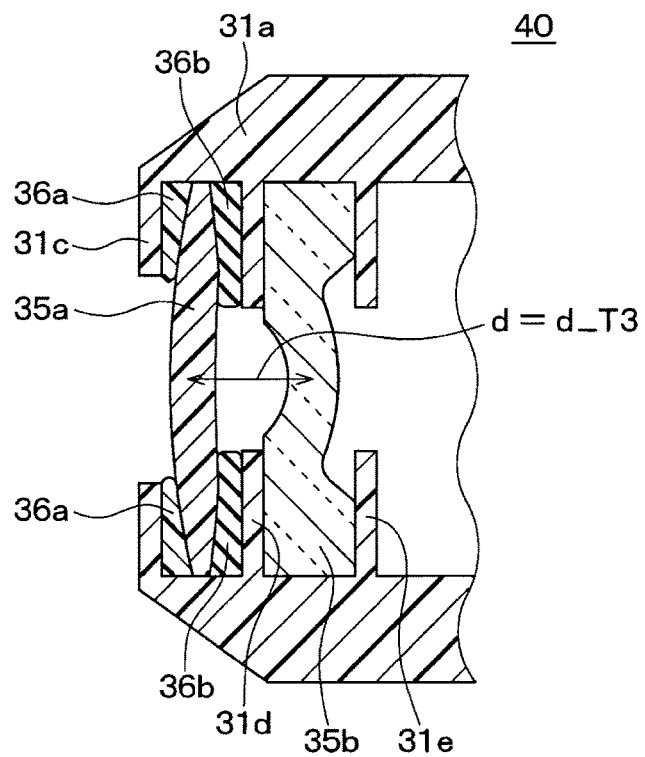
FIG. 7C is an enlarged view of the lens section according to the first embodiment at low temperature.

As shown in FIG. 7C, when the temperature of the lenses 35a and 35b decreases from the normal temperature T1 to the low temperature T3, the object-side lens 35a is deformed. The amount of deformation due to the temperature decrease (thermal contraction) of the object-side lens 35a at the surface in contact with the object-side adhesive 36a and its vicinity is larger than that at the surface in contact with the image-side adhesive 36b and its vicinity.

As a result, since the object-side lens 35a is warped, the object-side lens 35a moves in the direction for its center portion to distance from the image-side lens 35b. Hence, the inter-lens distance d increases from d_T1 to d_T3. In this way, the inter-lens distance d increases with the decrease of the temperature of the lenses 35a and 35b.

For the image-side lens 35b, since there is no difference in characteristic between the adhesive for adhesion to the second inner flange 31d and the adhesive for adhesion to the third inner flange 31e, even if the image-side lens 35b is thermally deformed, it does not substantially contribute to the variation of the inter-lens distance d. When the image-side lens 35b is made of glass, the amount of its deformation due to the temperature change is far smaller than that of the object-side lens 35a made of resin.

As described in the foregoing, the focal distance f of the lens assembly constituted of the lenses 35a and 35b is given by the equation of $f = f1 \times f2 / (f1 + f2 - d)$. In this embodiment, since the numerator and the denominator of the right side are both negative, the focal length f becomes longer with the decrease of the inter-lens distance d. Accordingly, when the inter-lens distance d becomes shorter with the increase of the temperature, the focal length f of the lens assembly is caused to increase. On the other hand, when the inter-lens distance d becomes longer with the decrease of the temperature, the focal length f of the lens assembly is caused to decrease.

As explained above, when the changes of the refractive indices of the lenses 35a and 35b due to the temperature increase causes the focal length f of the lens assembly to decrease, the resultant deformation of the object-side lens 35a causes the focal length f of the lens assembly to increase conversely.

Likewise, when the changes of the refractive indices of the lenses 35a and 35b due to the temperature decrease causes the focal length f of the lens assembly to increase, the resultant deformation of the object-side lens 35a causes the focal length f of the lens assembly to decrease conversely.

That is, the effect of the change of the refractive indices and the effect of the resultant deformation cancel with each other. As a result, the variation of the focal length f of the lens assembly constituted of the lenses 35a and 35b with the temperature increase or decrease can be reduced, and the positional deviation between the focal point of the lens assembly and the position of the solid imaging element 33a can be reduced.

As explained above, the relatively harder adhesive 36a is interposed between the first holder 31 and the surface on the side opposite to the lens 35b of the lens 35a. Also, the relatively softer adhesive 36b is interposed between the first holder 31 and the surface on the side facing the lens 35b of the lens 35a.

By disposing the adhesives 36a and 36b having different elastic moduli on the different sides of the lens 35a, the thermal deformation of the lens 35a can be adjusted, and accordingly the inter-lens distance d can be adjusted. That is, by appropriately determining which of the adhesives 36a and 36b should be disposed on which of the different sides of the lens 35a, it becomes possible that the effect of the change of the refractive indices of the lenses 35a and 35b on the focal length f and the effect of the resultant deformation of the lens 35a on the focal length f cancel with each other, to thereby reduce the variation of the focal length f with the temperature change.

In addition, since the means for compensating the refractive indices of the lenses 35a and 35b is just an adhesive normally used for fixing them, the parts count of the lens module 40 and the imaging apparatus 1 can be prevented from being increased.

Second Embodiment

Figure 8A:
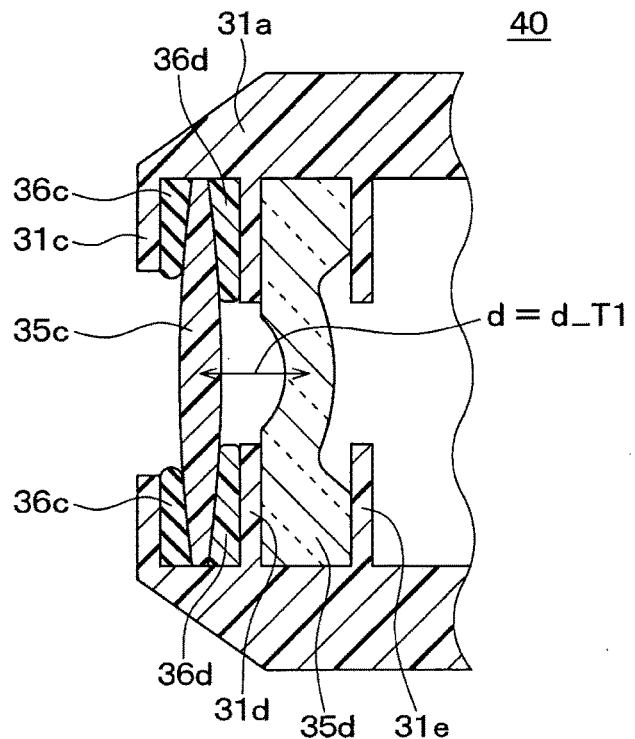
FIG. 8A is an enlarged view of a lens section of a camera module according to a second embodiment at the normal temperature.

Next, a second embodiment of the invention is described with reference to FIGS. 8A to 8C. The second embodiment differs from the first embodiment in that the object-side lens 35a and the image-side lens 35b are replaced by an object-side lens 35c and an image-side lens 35d, respectively, and the object-side adhesive 36a and the image-side adhesives 36b are replaced by an object-side adhesive 36c and an image-side adhesive 36d.

The first holder 31, the object-side lens 35c, the image-side lens 35d, the object-side adhesive 36c and the image-side adhesive 36d constitute a lens module 40. In the second embodiment, the object-side lens 35c corresponds to the first lens, the image-side lens 35d corresponds to the second lens, the object-side adhesive 36c corresponds to the second adhesive and the image-side adhesive 36d corresponds to the first adhesive.

In this embodiment, the object-side lens 35c is a lens made of resin, and the image-side lens 35d is a lens made of glass.

These two lenses 35c and 35d constitute a lens assembly. The image-side lens 35c is disposed closer to the image forming side or the side of the solid imaging element 33a than the object-side lens 35c is.

The object-side adhesive 36c is interposed between the peripheral portion of the surface on the object side (the left side in FIGS. 8A to 8C) of the object-side lens 35c and the first inner flange 31c to cause the object-side lens 35c to adhere to the first inner flange 31c. The image-side adhesive 36d is interposed between the peripheral portion of the surface on the image forming side (the side of the solid imaging element 33a) of the object-side lens 35c and the second inner flange 31d to cause the object-side lens 35c to adhere to the second inner flange 31d. Here, the image forming side is the side of an image formed by the lenses 35c and 35d (the right side of FIGS. 8A to 8C).

The object-side adhesive 36c may be a silicone rubber adhesive, if the elastic modulus (Young's modulus, for example) of the silicone rubber adhesive is smaller than that of the object-side lens 35c. The object-side adhesive 36c may be an adhesive other than a silicone rubber adhesive, but its elastic modulus has to be smaller than that of the object-side lens 35c. Since the elastic modulus of the object-side adhesive 36c is smaller than that of the object-side lens 35c, the linear expansion coefficient of the object-side adhesive 36c is larger than that of the object-side lens 35c.

The image-side adhesive 36d may be an epoxy resin adhesive, if the elastic modulus of the epoxy resin adhesive is larger than that of the object-side lens 35c. The image-side adhesives 36d may be an adhesive other than an epoxy resin adhesive, but its elastic modulus has to be larger than that of the object-side lens 35c. Since the elastic modulus of the image-side adhesive 36d is larger than that of the object-side lens 35c, the linear expansion coefficient of the image-side adhesive 36d is smaller than that of the object-side lens 35c.

In this way, the object-side lens 35c is adhered to the first inner flange 31c at its surface on the object side with the object-side adhesive 36c, and adhered to the second inner flange 31d at its surface on the image side (on the side of the solid imaging element 33a) with the image-side adhesive 36d.

For the image-side lens 35d, the adhesive interposed between the peripheral portion of the surface on the object side and the second inner flange 31d and the adhesive interposed between the peripheral portion of the surface on the image side and the third inner flange 31e are the same as each other in material and elastic modulus.

As explained above, the image-side lens 35d is adhered to the second inner flange 31d with the adhesive at the surface on the object side, and adhered to the third inner flange 31e at the surface on the image side with the same adhesive.

Next, the optical characteristics of the object-side lens 35c and the image-side lens 35d are explained. When the focal length of the object-side lens 35c is f1, the focal length of the image-side lens 35d is f2, and the distance between the object-side lens 35c and the image-side lens 35d (referred to as the "inter-lens distance" hereinafter) is d, the focal length f of the lens assembly is given by the following equation.

$$f = f1 \times f2 / (f1 + f2 - d)$$

In this embodiment, the value of f1×f2 is negative. This is because, the focal length f1 is positive because the object-side lens 35c is a convex lens, and the focal length f2 is negative because the image-side lens 35d is a concave lens. The relationship of f1×f2<0 always holds within the same operation temperature range as the first embodiment. Further, the value of (f1+f2−d) is always negative within the operation temperature range. Therefore, the focal length f of the lens assembly constituted of the lenses 35c and 35d is positive within the operation temperature range.

The focal point of the lens assembly is adjusted in advance so as to coincide with the position of the solid imaging element 33a when the temperature of the object-side lens 35c and the image-side lens 35d is equal to a predetermined normal temperature T1 (20° C., for example). Here, it is assumed that the inter-lens distance d is d_T1 when the temperature of the lenses 35c and 35d is T1.

When the temperature of the object-side lens 35c and the image-side lens 35d increases from T1, it occurs as follows. In this case, the refractive indices of the lenses 35c and 35d vary with the increase of the temperature to increase the focal length f of the lens assembly. This is explained below more specifically.

It is assumed that the focal length f of the lens assembly constituted of the lenses 35c and 35d is f_T1 when their temperature is equal to the normal temperature T1, and the focal lengths f1 and f2 are f1_T2 and f2_T2, respectively, when their temperature has increased to a high temperature T2 (100° C., for example). In this case, the relationship of f_T1<f1_T2×f2_T2/(f1_T2+f2_T2−d_T1) holds. Incidentally, since the denominator of the right side of this inequality is equal to the inter-lens distance d at the normal temperature of T1, the value of the right side is different from the focal length f of the lens assembly at the high temperature T2. That is, if the values of the inter-lens distance d at the normal temperature T1 and at the high temperature T2 are the same as each other, the focal length f of the lens assembly becomes longer as a result of variation of the refractive indices of the lenses 35c and 35d.

Generally, the refractive index of a lens is roughly a linear function of the temperature within its operation temperature range. Accordingly, the above holds regardless of the value of T2 as long as T2 is within the operation temperature range. When the temperature of the lenses 35c and 35d falls from the normal temperature T1 to a low temperature T3, the opposite to the above holds. T3 may be −40° C., for example.

That is, in this case, the refractive indices of the lenses 35c and 35d vary with the decrease of the temperature to reduce the focal length f of the lens assembly. When it is assumed that the focal length f1 is f1_T3 and the focal length f2 is f2_T3 after the temperature of the lenses 35c and 35d has fallen to the low temperature T3, the relationship of f_T1>f1_T3×f3_T3/(f1_T3+f2_T3−d_T1) holds.

That is, if the values of the inter-lens distance d at the normal temperature T1 and at the low temperature T3 are the same as each other, the focal length f of the lens assembly becomes shorter as a result of the variation of the refractive indices of the lenses 35c and 35d.

The variation of the refractive indices and the variation of the focal length as described above are possible for the lens assembly constituted of the lenses 35c and 35d when the following conditions (A) and (B) are both satisfied, for example.

(A) The amount of the variation of the refractive index and the amount of the resultant variation of the focal length in the object-side lens 35c are far larger than those in the image-side lens 35d.

(B) The focal length f1 increases due to variation of the refractive index as the temperature increases, and decreases due to variation of the refractive index as the temperature decreases.

As a resin lens satisfying the condition (B), there is known a lens made of cycloolefin polymer.

Next, variation of the focal length f of the lens assembly constituted of the lenses 35c and 35d with temperature change is explained in detail. As shown in FIG. 8A, the inter-lens distance d is d_T1 when the lenses 35a and 35b are at the normal temperature T1. As explained in the foregoing, the focal point of the lens assembly coincides with the position of the solid imaging element 33a at this time.

Figure 8B:
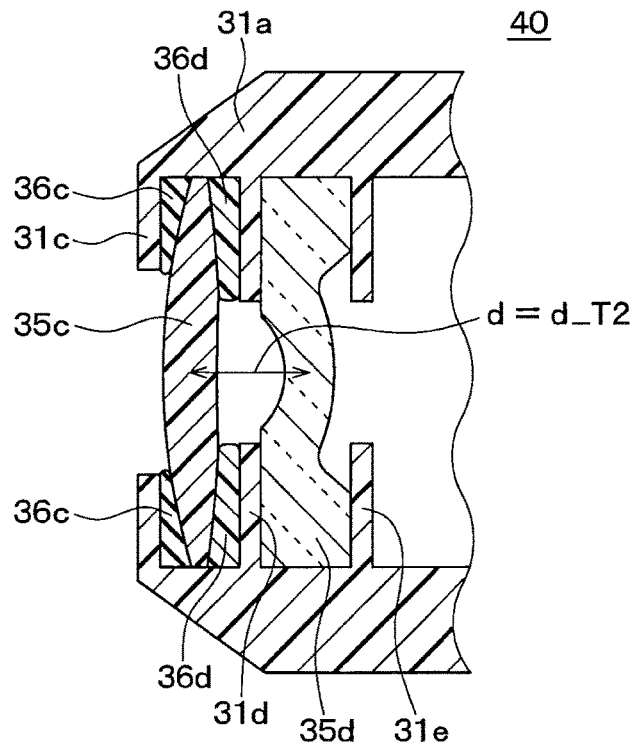
FIG. 8B is an enlarged view of the lens section of the camera module according to the second embodiment at the high temperature.

As shown in FIG. 8B, when the temperature of the lens assembly increases to the high temperature T2, the object-side lens 35c is deformed. The elastic modulus of the object-side adhesive 36c is lower than that of the object-side lens 35c. That is, the object-side adhesive 36c is softer than the object-side lens 35c. The elastic modulus of the image-side adhesive 36d is higher than that of the object-side lens 35c. That is, the image-side adhesive 36d is harder than the object-side lens 35c. Accordingly, the amount of deformation due to the temperature increase (thermal expansion) of the object-side lens 35c at the surface in contact with the image-side adhesive 36d and its vicinity is smaller than that at the surface in contact with the object-side adhesive 36c and its vicinity. That is, the object-side lens 35c is deformed more freely at the side of the object-side adhesive 36c than at the side of the image-side adhesive 36d.

As a result, since the object-side lens 35c is warped, the object-side lens 35c moves in the direction for its center portion to distance from the image-side lens 35d. Hence, the inter-lens distance d increases from d_T1 to d_T2. In this way, the inter-lens distance d increases with the increase of the temperature of the lenses 35c and 35d.

As shown in FIG. 8C, when the temperature of the lenses 35a and 35b decreases from the normal temperature T1 to the low temperature T3, the object-side lens 35c is deformed. The amount of deformation due to the temperature decrease (thermal contraction) of the object-side lens 35c at the surface in contact with the object-side adhesive 36c and its vicinity is larger than that at the surface in contact with the image-side adhesive 36d and its vicinity.

As a result, since the object-side lens 35c is warped, the object-side lens 35c moves in the direction for its center portion to approach the image-side lens 35d. Hence, the inter-lens distance d decreases from d_T1 to d_T3. In this way, the inter-lens distance d decreases with the decrease of the temperature of the lenses 35c and 35d.

For the image-side lens 35d, since there is no difference in characteristic between the adhesive for adhesion to the second inner flange 31d and the adhesive for adhesion to the third inner flange 31e, even if the image-side lens 35d is thermally deformed, it does not substantially contribute to the variation of the inter-lens distance d. When the image-side lens 35d is made of glass, the amount of its deformation due to the temperature change is far smaller than that of the object-side lens 35c made of resin.

As described in the foregoing, the focal distance f of the lens assembly constituted of the lenses 35c and 35d is given by the equation of $f = f1 \times f2/(f1+f2-d)$. In this embodiment, since the numerator and the denominator of the right side are both negative, the focal length f becomes longer with the decrease of the inter-lens distance d. Accordingly, when the inter-lens distance d becomes longer with the increase of the temperature, the focal length f of the lens assembly is caused to decrease. On the other hand, when the inter-lens distance d becomes shorter with the decrease of the temperature, the focal length f of the lens assembly is caused to increase.

As explained above, when the changes of the refractive indices of the lenses 35c and 35d due to the temperature increase causes the focal length f of the lens assembly to increase, the resultant deformation of the object-side lens 35c causes the focal length f of the lens assembly to decrease conversely.

Likewise, when the changes of the refractive indices of the lenses 35c and 35d due to the temperature decrease causes the focal length f of the lens assembly to decrease, the resultant deformation of the object-side lens 35c causes the focal length f of the lens assembly to increase conversely.

That is, the effect of the change of the refractive indices and the effect of the resultant deformation cancel with each other. As a result, the variation of the focal length f of the lens assembly constituted of the lenses 35c and 35d with the temperature increase or decrease can be reduced, and the positional deviation between the focal point of the lens assembly and the position of the solid imaging element 33a can be reduced.

As explained above, the relatively harder adhesive 36d is interposed between the first holder 31 and the surface on the side facing the lens 35d of the lens 35c. Also, the relatively softer adhesive 36c is interposed between the first holder 31 and the surface on the side opposite to the lens 35d of the lens 35c.

By disposing the adhesives 36c and 36d having different elastic moduli on the different sides of the lens 35a, the thermal deformation of the lens 35c can be adjusted, and accordingly the inter-lens distance d can be adjusted. That is, by appropriately determining which of the adhesives 36c and 36d should be disposed on which of the different sides of the lens 35c, it becomes possible that the effect of the change of the refractive indices of the lenses 35c and 35d on the focal length f and the effect of the resultant deformation of the lens 35c on the focal length f cancel with each other, to thereby reduce the variation of the focal length f with the temperature change.

In addition, since the means for compensating the refractive indices of the lenses 35c and 35d is just an adhesive normally used for fixing them, the parts count of the lens module 40 and the imaging apparatus 1 can be prevented from being increased.

Third Embodiment

Next, a third embodiment of the invention is described with reference to FIGS. 9A to 9C. The third embodiment differs from the first embodiment in that the object-side lens 35a and the image-side lens 35b are replaced by an object-side lens 35e and an image-side lens 35f, respectively, and the object-side adhesive 36a and the image-side adhesive 36b are replaced by an object-side adhesive 36e and an image-side adhesive 36f. In the third embodiment, the adhesives 36e and 36f are not for the object-side lens 35e but for the image-side lens 35f.

The first holder 31, the object-side lens 35e, the image-side lens 35f, the object-side adhesive 36e and the image-side adhesive 36f constitute a lens module 40. In the third embodiment, the object-side lens 35e corresponds to the second lens, the image-side lens 35f corresponds to the first lens, the object-side adhesive 36e corresponds to the second adhesive and the image-side adhesive 36f corresponds to the first adhesive.

In this embodiment, the object-side lens 35e is a lens made of glass, and the image-side lens 35f is a lens made of resin.

These two lenses 35e and 35f constitute a lens assembly. The image-side lens 35f is disposed closer to the image forming side or the side of the solid imaging element 33a than the object-side lens 35e is.

The object-side adhesive 36e is interposed between the peripheral portion of the surface on the object side (the left side in FIGS. 9A to 9C) of the image-side adhesive 36f and the second inner flange 31d to cause the object-side lens 35f to adhere to the second inner flange 31d. The image-side adhesive 36f is interposed between the peripheral portion of the surface on the image forming side (the side of the solid imaging element 33a) of the image-side lens 35f and the third inner flange 31e to cause the image-side lens 35f to adhere to the third inner flange 31e. Here, the image forming side is the side of an image formed by the lenses 35e and 35f (the right side of FIGS. 9A to 9C).

The object-side adhesive 36e may be a silicone rubber adhesive, if the elastic modulus (Young's modulus, for example) of the silicone rubber adhesive is smaller than that of the image-side lens 35f. The object-side adhesive 36e may be an adhesive other than a silicone rubber adhesive, but its elastic modulus has to be smaller than that of the image-side lens 35f. Since the elastic modulus of the object-side adhesive 36e is smaller than that of the image-side lens 35f, the linear expansion coefficient of the object-side adhesive 36e is larger than that of the image-side lens 35f.

The image-side adhesive 36f may be an epoxy resin adhesive, if the elastic modulus of the epoxy resin adhesive is larger than that of the image-side lens 35f. The image-side adhesives 36f may be an adhesive other than an epoxy resin adhesive, but its elastic modulus has to be larger than that of the image-side lens 35f. Since the elastic modulus of the image-side adhesive 36f is larger than that of the image-side lens 35f, the linear expansion coefficient of the image-side adhesive 36f is smaller than that of the image-side lens 35f.

In this way, the image-side lens 35f is adhered to the second inner flange 31d at its surface on the object side with the object-side adhesive 36e, and adhered to the third inner flange 31e at its surface on the image side (on the side of the solid imaging element 33a) with the image-side adhesive 36f.

For the object-side lens 35e, the adhesive interposed between the peripheral portion of the surface on the object side and the first inner flange 31c and the adhesive interposed between the peripheral portion of the surface on the image side (the side of the solid imaging element 33a) and the second inner flange 31d are the same as each other in material and elastic modulus.

As explained above, the object-side lens 35e is adhered to the first inner flange 31c with the adhesive at the surface on the object side, and adhered to the second inner flange 31d at the surface on the image side with the same adhesive.

Next, the optical characteristics of the object-side lens 35e and the image-side lens 35f are explained. When the focal length of the object-side lens 35e is f1, the focal length of the image-side lens 35f is f2, and the distance between the object-side lens 35e and the image-side lens 35f (referred to as the "inter-lens distance" hereinafter) is d, the focal length f of the lens assembly is given by the following equation.

$$f = f1 \times f2 / (f1 + f2 - d)$$

In this embodiment, the value of f1×f2 is negative. This is because, the focal length f1 is positive because the object-side lens 35e is a convex lens, and the focal length f2 is negative because the image-side lens 35f is a concave lens. The relationship of f1×f2<0 always holds within the same operation temperature range as the first embodiment. Further, the value of (f1+f2−d) is always negative within the operation temperature range. Therefore, the focal length f of the lens assembly constituted of the lenses 35e and 35f is positive within the operation temperature range.

The focal point of the lens assembly is adjusted in advance so as to coincide with the position of the solid imaging element 33a when the temperature of the object-side lens 35e and the image-side lens 35f is equal to a predetermined normal temperature T1 (20° C., for example). Here, it is assumed that the inter-lens distance d is d_T1 when the temperature of the lenses 35e and 35f is T1.

When the temperature of the object-side lens 35e and the image-side lens 35f increases from T1, it occurs as follows. In this case, the refractive indices of the lenses 35e and 35f vary with the increase of the temperature to reduce the focal length f of the lens assembly. This is explained below more specifically.

It is assumed that the focal length f of the lens assembly constituted of the lenses 35e and 35f is f_T1 when their temperature is equal to the normal temperature T1, and the focal lengths f1 and f2 are f1_T2 and f2_T2, respectively, when their temperature has increased to a high temperature T2 (100° C., for example). In this case, the relationship of f_T1>f1_T2×f2_T2/(f1_T2+f2_T2−d_T1) holds. Incidentally, since the denominator of the right side of this inequality is equal to the inter-lens distance d at the normal temperature of T1, the value of the right side is different from the focal length f of the lens assembly at the high temperature T2. That is, if the values of the inter-lens distance d at the normal temperature T1 and at the high temperature T2 are the same as each other, the focal length f of the lens assembly becomes shorter as a result of the variation of the refractive indices of the lenses 35a and 35b.

Generally, the refractive index of a lens is roughly a linear function of the temperature within its operation temperature range. Accordingly, the above holds regardless of the value of T2 as long as T2 is within the operation temperature range. When the temperature of the lenses 35e and 35f falls from the normal temperature T1 to a low temperature T3, the opposite to the above holds. T3 may be −40° C., for example.

That is, in this case, the refractive indices of the lenses 35e and 35f vary with the decrease of the temperature to increase the focal length f of the lens assembly. When it is assumed that the focal length f1 is f1_T3 and the focal length f2 is f2_T3 after the temperature of the lenses 35e and 35f has fallen to the low temperature T3, the relationship of f_T1<f1_T3×f3_T3/(f1_T3+f2_T3−d_T1) holds. That is, if the values of the inter-lens distance d at the normal temperature T1 and at the low temperature T3 are the same as each other, the focal length f of the lens assembly becomes longer as a result of variation of the refractive indices of the lenses 35e and 35f.

The variation of the refractive indices and the variation of the focal length as described above are possible for the lens assembly constituted of the lenses 35e and 35f when the following conditions (A) and (B) are both satisfied, for example.

(A) The amount of the variation of the refractive index and the amount of the resultant variation of the focal length in the image-side lens 35f are far larger than those in the object-side lens 35e.

(B) The absolute value of the focal length f2 increases due to variation of the refractive index as the temperature increases, and decreases due to variation of the refractive index as the temperature decreases.

(C) The focal length f1 is always larger than the inter-lens distance d within the operation temperature range.

As a resin lens satisfying the condition (B), there is known a lens made of cycloolefin polymer.

Next, variation of the focal length f of the lens assembly constituted of the lenses 35e and 35f with the temperature change is explained in detail. As shown in FIG. 9A, the inter-lens distance d is d_T1 when the lenses 35e and 35f are at the normal temperature T1. As explained in the foregoing, the focal point of the lens assembly coincides with the position of the solid imaging element 33a at this time.

Figure 9B:
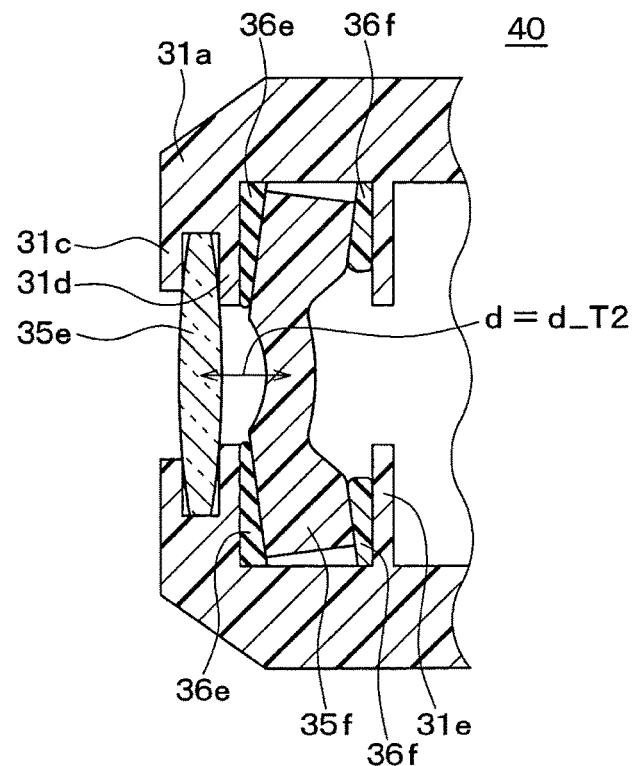
FIG. 9B is an enlarged view of the lens section of the camera module according to the third embodiment at the high temperature.

As shown in FIG. 9B, when the temperature of the lens assembly increases to the high temperature T2, the image-side lens 35f is deformed. The elastic modulus of the object-side adhesive 36e is lower than that of the image-side lens 35f. That is, the object-side adhesive 36e is softer than the image-side lens 35f. The elastic modulus of the image-side adhesive 36f is higher than that of the image-side lens 35f. That is, the image-side adhesive 36f is harder than the image-side lens 35f. Accordingly, the amount of deformation due to the temperature increase (thermal expansion) of the image-side lens 35f at the surface in contact with the image-side adhesive 36f and its vicinity is smaller than that at the surface in contact with the object-side adhesive 36e and its vicinity. That is, the image-side lens 35f is deformed more freely at the side of the object-side adhesive 36e than at the side of the image-side adhesive 36f.

As a result, since the image-side lens 35f is warped, the image-side lens 35f moves in the direction for its center portion to approach the object-side lens 35e. Hence, the inter-lens distance d decreases from d_T1 to d_T2. In this way, the inter-lens distance d decreases with the increase of the temperature of the lenses 35e and 35f.

Figure 9C:
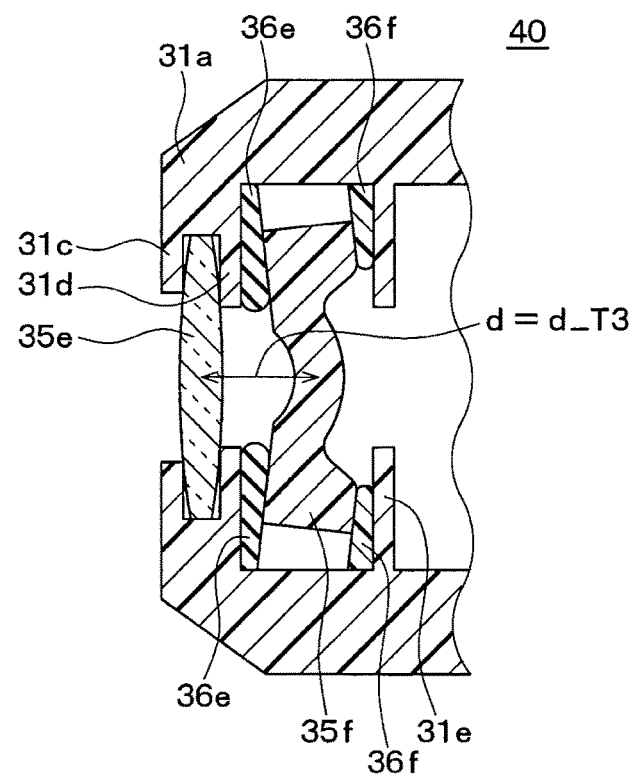
FIG. 9C is an enlarged view of the lens section of the camera module according to the third embodiment at the low temperature.

As shown in FIG. 9C, when the temperature of the lenses 35e and 35f decreases from the normal temperature T1 to the low temperature T3, the image-side lens 35f is deformed. The amount of deformation due to the temperature decrease (thermal contraction) of the image-side lens 35f at the surface in contact with the object-side adhesive 36e and its vicinity is larger than that at the surface in contact with the image-side adhesive 36f and its vicinity.

As a result, since the image-side lens 35f is warped, the image-side lens 35f moves in the direction for its center portion to distance from the object-side lens 35e. Hence, the inter-lens distance d increases from d_T1 to d_T3. In this way, the inter-lens distance d increases with the decrease of the temperature of the lenses 35e and 35f.

For the object-side lens 35e, since there is no difference in characteristic between the adhesive for adhesion to the first inner flange 31c and the adhesive for adhesion to the second inner flange 31d, even if the object-side lens 35e is thermally deformed, it does not substantially contribute to the variation of the inter-lens distance d. When the object-side lens 35e is made of glass, the amount of its deformation due to the temperature change is far smaller than that of the image-side lens 35f made of resin.

As described in the foregoing, the focal distance f of the lens assembly constituted of the lenses 35e and 35f is given by the equation of $f = f1 \times f2/(f1+f2-d)$. In this embodiment, since the numerator and the denominator of the right side are both positive, the focal length f becomes longer with the decrease of the inter-lens distance d. Accordingly, when the inter-lens distance d becomes shorter with the increase of the temperature, the focal length f of the lens assembly is caused to increase. On the other hand, when the inter-lens distance d becomes longer with the decrease of the temperature, the focal length f of the lens assembly is caused to decrease.

As explained above, when the changes of the refractive indices of the lenses 35e and 35f due to the temperature increase causes the focal length f of the lens assembly to decrease, the resultant deformation of the image-side lens 35f causes the focal length f of the lens assembly to increase conversely.

Likewise, when the changes of the refractive indices of the lenses 35e and 35f due to the temperature decrease causes the focal length f of the lens assembly to increase, the resultant deformation of the image-side lens 35f causes the focal length f of the lens assembly to decrease conversely.

That is, the effect of the change of the refractive indices and the effect of the resultant deformation cancel with each other. As a result, the variation of the focal length f of the lens assembly constituted of the lenses 35e and 35f with the temperature increase or decrease can be reduced, and the positional deviation between the focal point of the lens assembly and the position of the solid imaging element 33a can be reduced.

As explained above, the relatively harder adhesive 36f is interposed between the first holder 31 and the surface on the side opposite to the lens 35e of the lens 35f. Also, the relatively softer adhesive 36f is interposed between the first holder 31 and the surface on the side facing the lens 35e of the lens 35f.

By disposing the adhesives 36e and 36f having different elastic moduli on the different sides of the lens 35f, the thermal deformation of the lens 35f can be adjusted, and accordingly the inter-lens distance d can be adjusted. That is, by appropriately determining which of the adhesives 36e and 36f should be disposed on which of the different sides of the lens 35f, it becomes possible that the effect of the change of the refractive indices of the lenses 35e and 35f and on the focal length f and the effect of the resultant deformation of the lens 35f on the focal length f cancel with each other, to thereby reduce the variation of the focal length f with the temperature change.

In addition, since the means for compensating the refractive indices of the lenses 35e and 35f is just an adhesive normally used for fixing them, the parts count of the lens module 40 and the imaging apparatus 1 can be prevented from being increased.

Fourth Embodiment

Figure 10A:
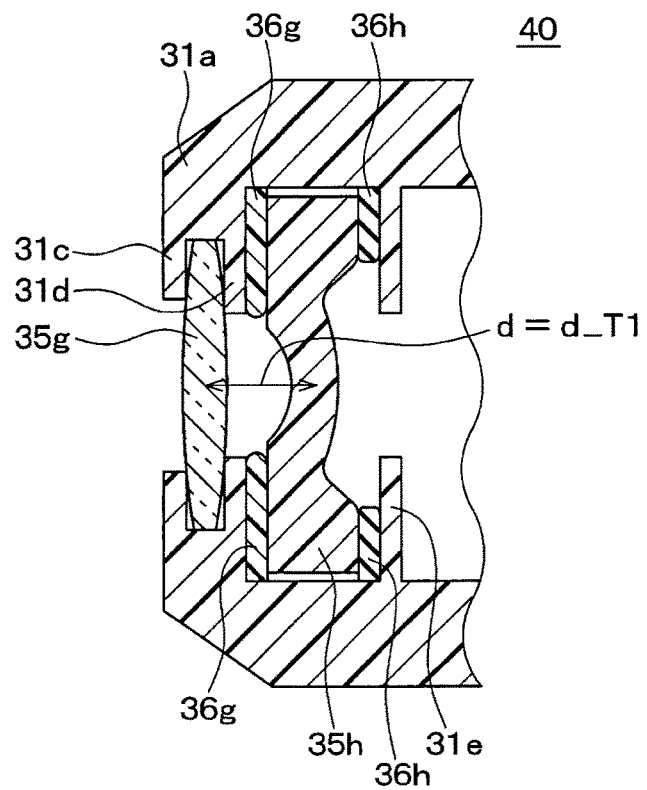
FIG. 10A is an enlarged view of a lens section of a camera module according to a fourth embodiment at the normal temperature.

Next, a fourth embodiment of the invention is described with reference to FIGS. 10A to 10C. The fourth embodiment differs from the first embodiment in that the object-side lens 35a and the image-side lens 35b are replaced by an object-side lens 35g and an image-side lens 35h, respectively, and the object-side adhesive 36a and the image-side adhesive 36b are replaced by an object-side adhesive 36g and an image-side adhesive 36h. In the fourth embodiment, the adhesives 36g and 36h are not for the object-side lens 35g but for the image-side lens 35h.

The first holder 31, the object-side lens 35g, the image-side lens 35h, the object-side adhesive 36g and the image-side adhesive 36h constitute a lens module 40. In the fourth embodiment, the object-side lens 35g corresponds to the second lens, the image-side lens 35h corresponds to the first lens, the object-side adhesive 36g corresponds to the first adhesive and the image-side adhesive 36h corresponds to the second adhesive.

In this embodiment, the object-side lens 35g is a lens made of glass, and the image-side lens 35h is a lens made of resin.

These two lenses 35g and 35h constitute a lens assembly. The image-side lens 35h is disposed closer to the image forming side or the side of the solid imaging element 33a than the object-side lens 35g is.

The object-side adhesive 36g is interposed between the peripheral portion of the surface on the object side (the left side in FIGS. 10A to 10C) of the image-side adhesive 36h and the second inner flange 31d to cause the image-side lens 35h to adhere to the second inner flange 31d. The image-side adhesive 36h is interposed between the peripheral portion of the surface on the image forming side (the side of the solid imaging element 33a) of the image-side lens 35h and the third inner flange 31e to cause the image-side lens 35h to adhere to the third inner flange 31e. Here, the image forming side is the side of an image formed by the lenses 35g and 35h (the right side of FIGS. 10A to 10C).

The object-side adhesive 36g may be an epoxy resin adhesive, if the elastic modulus (Young's modulus, for example) of the epoxy resin adhesive is larger than that of the image-side lens 35h. The object-side adhesives 36g may be an adhesive other than an epoxy resin adhesive, but its elastic modulus has to be larger than that of the image-side lens 35h. Since the elastic modulus of the object-side adhesive 36g is larger than that of the image-side lens 35h, the linear expansion coefficient of the object-side adhesive 36g is smaller than that of the image-side lens 35h.

The image-side adhesive 36h may be a silicone rubber adhesive, if the elastic modulus of the silicone rubber adhesive is smaller than that of the image-side lens 35h. The image-side adhesive 36h may be an adhesive other than a silicone rubber adhesive, but its elastic modulus has to be smaller than that of the image-side lens 35h. Since the elastic modulus of the image-side adhesive 36h is smaller than that of the image-side lens 35h, the linear expansion coefficient of the image-side adhesive 36h is smaller than that of the image-side lens 35h.

In this way, the image-side lens 35h is adhered to the second inner flange 31d at its surface on the object side with the object-side adhesive 36g, and adhered to the third inner flange 31e at its surface on the image side (on the side of the solid imaging element 33a) with the image-side adhesive 36h.

For the object-side lens 35g, the adhesive interposed between the peripheral portion of the surface on the object side and the first inner flange 31c and the adhesive interposed between the peripheral portion of the surface on the image side (the side of the solid imaging element 33a) and the second inner flange 31d are the same as each other in material and elastic modulus.

As explained above, the object-side lens 35g is adhered to the first inner flange 31c with the adhesive at the surface on the object side, and adhered to the second inner flange 31d at the surface on the image side with the same adhesive.

Next, the optical characteristics of the object-side lens 35g and the image-side lens 35h are explained. When the focal length of the object-side lens 35g is f1, the focal length of the image-side lens 35h is f2, and the distance between the object-side lens 35g and the image-side lens 35h (referred to as the "inter-lens distance" hereinafter) is d, the focal length f of the lens assembly is given by the following equation.

$$f = f1 \times f2 / (f1 + f2 - d)$$

In this embodiment, the value of f1×f2 is negative. This is because, the focal length f1 is positive because the object-side lens 35g is a convex lens, and the focal length f2 is negative because the image-side lens 35h is a concave lens. The relationship of f1×f2<0 always holds within the same operation temperature range as the first embodiment. Further, the value of (f1+f2−d) is always negative within the operation temperature range. Therefore, the focal length f of the lens assembly constituted of the lenses 35f and 35h is positive within the operation temperature range.

The focal point of the lens assembly is adjusted in advance so as to coincide with the position of the solid imaging element 33a when the temperature of the object-side lens 35g and the image-side lens 35h is equal to a predetermined normal temperature T1 (20° C., for example). Here, it is assumed that the inter-lens distance d is d_T1 when the temperature of the lenses 35g and 35h is T1.

When the temperature of the object-side lens 35g and the image-side lens 35h increases from T1, it occurs as follows. In this case, the refractive indices of the lenses 35g and 35h vary with the increase of the temperature to increase the focal length f of the lens assembly. This is explained below more specifically.

It is assumed that the focal length f of the lens assembly constituted of the lenses 35g and 35h is f_T1 when their temperature is equal to the normal temperature T1, and the focal lengths f1 and f2 are f1_T2 and f2_T2, respectively, when their temperature has increased to a high temperature T2 (100° C., for example). In this case, the relationship of f_T1<f1_T2×f2_T2/(f1_T2+f2_T2−d_T1) holds. Incidentally, the denominator of the right side of this inequality is equal to the inter-lens distance d at the normal temperature of T1, the value of the right side is different from the focal length f of the lens assembly at the high temperature T2. That is, if the values of the inter-lens distance d at the normal temperature T1 and at the high temperature T2 are the same as each other, the focal length f of the lens assembly becomes longer as a result of variation of the refractive indices of the lenses 35g and 35h.

Generally, the refractive index of a lens is roughly a linear function of the temperature within its operation temperature range. Accordingly, the above holds regardless of the value of T2 as long as T2 is within the operation temperature range. When the temperature of the lenses 35g and 35h falls from the normal temperature T1 to a low temperature T3, the opposite to the above holds. T3 may be −40° C., for example.

That is, in this case, the refractive indices of the lenses 35g and 35h vary with the decrease of the temperature to reduce the focal length f of the lens assembly. When it is assumed that the focal length f1 is f1_T3 and the focal length f2 is f2_T3 after the temperature of the lenses 35g and 35h has fallen to the low temperature T3, the relationship of f_T1>f1_T3×f3_T3/(f1_T3+f2_T3−d_T1) holds. That is, if the values of the inter-lens distance d at the normal temperature T1 and at the low temperature T3 are the same as each other, the focal length f of the lens assembly becomes shorter as a result of the variation of the refractive indices of the lenses 35g and 35h.

The variation of the refractive indices and the variation of the focal length as described above are possible for the lens assembly constituted of the lenses 35g and 35h when the following conditions (A) and (B) are both satisfied, for example.

(A) The amount of the variation of the refractive index and the amount of the resultant variation of the focal length in the image-side lens 35h are far larger than those in the object-side lens 35g.

(B) The absolute value of the focal length f2 decreases due to variation of the refractive index as the temperature increases, and increases due to variation of the refractive index as the temperature decreases.

(C) The focal length f1 is always larger than the inter-lens distance d within the operation temperature range.

As a resin lens satisfying the condition (B), there is known a lens made of cycloolefin polymer.

Next, variation of the focal length f of the lens assembly constituted of the lenses 35g and 35h with the temperature change is explained in detail. As shown in FIG. 10A, the inter-lens distance d is d_T1 when the lenses 35g and 35h are at the normal temperature T1. As explained in the foregoing, the focal point of the lens assembly coincides with the position of the solid imaging element 33a at this time.

Figure 10B:
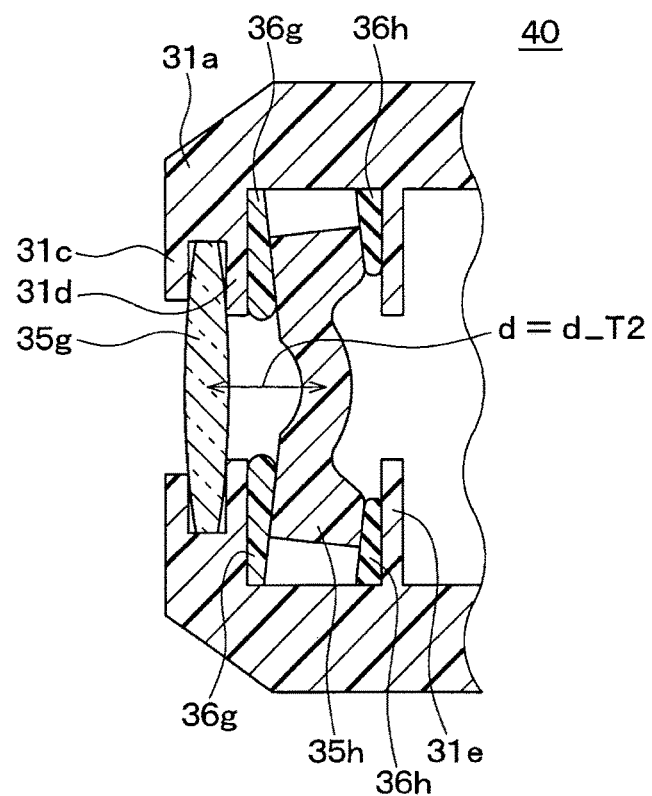
FIG. 10B is an enlarged view of the lens section of the camera module according to the fourth embodiment at the high temperature.

As shown in FIG. 10B, when the temperature of the lens assembly increases to the high temperature T2, the image-side lens 35h is deformed. The elastic modulus of the object-side adhesive 36g is higher than that of the image-side lens 35h. That is, the object-side adhesive 36g is harder than the image-side lens 35h. The elastic modulus of the image-side adhesive 36h is lower than that of the image-side lens 35h. That is, the image-side adhesive 36h is softer than the object-side lens 35h. Accordingly, the amount of deformation due to the temperature increase (thermal expansion) of the image-side lens 35h at the surface in contact with the object-side adhesive 36g and its vicinity is larger than that at the surface in contact with the image-side adhesive 36h and its vicinity. That is, the image-side lens 35h is deformed more freely at the side of the image-side adhesive 36h than at the side of the object-side adhesive 36g.

As a result, since the image-side lens 35g is warped, the image-side lens 35g moves in the direction for its center portion to distance from the object-side lens 35g. Hence, the inter-lens distance d increases from d_T1 to d_T2. In this way, the inter-lens distance d increases with the increase of the temperature of the lenses 35g and 35h.

As shown in FIG. 10C, when the temperature of the lenses 35g and 35h decreases from the normal temperature T1 to the low temperature T3, the image-side lens 35h is deformed. The amount of deformation due to the temperature decrease (thermal contraction) of the image-side lens 35h at the surface in contact with the object-side adhesive 36g and its vicinity is smaller than that at the surface in contact with the image-side adhesive 36h and its vicinity.

As a result, since the image-side lens 35h is warped, the image-side lens 35h moves in the direction for its center portion to approach the object-side lens 35g. Hence, the inter-lens distance d decreases from d_T1 to d_T3. In this way, the inter-lens distance d decreases with the decrease of the temperature of the lenses 35g and 35h.

For the object-side lens 35g, since there is no difference in characteristic between the adhesive for adhesion to the first inner flange 31c and the adhesive for adhesion to the second inner flange 31d, even if the object-side lens 35g is thermally deformed, it does not substantially contribute to the variation of the inter-lens distance d. When the object-side lens 35g is made of glass, the amount of its deformation due to the temperature change is far smaller than that of the image-side lens 35h made of resin.

As described in the foregoing, the focal distance f of the lens assembly constituted of the lenses 35g and 35hd is given by the equation of $f=f1 \times f2/(f1+f2-d)$. In this embodiment, since the numerator and the denominator of the right side are both negative, the focal length f becomes longer with the decrease of the inter-lens distance d. Accordingly, when the inter-lens distance d becomes longer with the increase of the temperature, the focal length f of the lens assembly is caused to decrease. On the other hand, when the inter-lens distance d becomes shorter with the decrease of the temperature, the focal length f of the lens assembly is caused to increase.

As explained above, when the changes of the refractive indices of the lenses 35g and 35h due to the temperature increase causes the focal length f of the lens assembly to increase, the resultant deformation of the image-side lens 35g causes the focal length f of the lens assembly to decrease conversely.

Likewise, when the changes of the refractive indices of the lenses 35g and 35h due to the temperature decrease causes the focal length f of the lens assembly to decrease, the resultant deformation of the image-side lens 35h causes the focal length f of the lens assembly to increase conversely.

That is, the effect of the change of the refractive indices and the effect of the resultant deformation cancel with each other. As a result, the variation of the focal length f of the lens assembly constituted of the lenses 35g and 35h with the temperature increase or decrease can be reduced, and the positional deviation between the focal point of the lens assembly and the position of the solid imaging element 33a can be reduced.

As explained above, the relatively harder adhesive 36g is interposed between the first holder 31 the surface on the side facing the lens 35g of the lens 35h. Also, the relatively softer adhesive 36h is interposed between the first holder 31 and the surface on the side opposite to the lens 35g of the lens 35h.

By disposing the adhesives 36g and 36h having different elastic moduli on the different sides of the lens 35h, the thermal deformation of the lens 35h can be adjusted, and accordingly the inter-lens distance d can be adjusted. That is, by appropriately determining which of the adhesives 36g and 36h should be disposed on which of the different sides of the lens 35h, it becomes possible that the effect of the change of the refractive indices of the lenses 35g and 35n on the focal length f and the effect of the resultant deformation of the lens 35h on the focal length f cancel with each other, to thereby reduce the variation of the focal length f with the temperature change.

In addition, since the means for compensating the refractive indices of the lenses 35g and 35h is just an adhesive normally used for fixing them, the parts count of the lens module 40 and the imaging apparatus 1 can be prevented from being increased.

Fifth Embodiment

Next, a fifth embodiment of the invention is described with reference to FIGS. 11A to 11C. The fifth embodiment differs from the first embodiment in that the object-side lens 35a and the image-side lens 35b are replaced by an object-side lens 35i and an image-side lens 35j, respectively, and the object-side adhesive 36a and the image-side adhesive 36b are replaced by an object-side adhesive 36i and an image-side adhesive 36j.

The first holder 31, the object-side lens 35i, the image-side lens 35j, the object-side adhesive 36i and the image-side adhesive 36j constitute a lens module 40. In the fifth embodiment, the object-side lens 35i corresponds to the first lens, the image-side lens 35j corresponds to the second lens, the object-side adhesive 36i corresponds to the second adhesive and the image-side adhesive 36j corresponds to the first adhesive.

In this embodiment, the object-side lens 35i is a lens made of resin, and the image-side lens 35j is a lens made of glass. These two lenses 35i and 35j constitute a lens assembly. The image-side lens 35j is disposed closer to the image forming side or the side of the solid imaging element 33a than the object-side lens 35i is.

The object-side adhesive 36i is interposed between the peripheral portion of the surface on the object side (the left side in FIGS. 11A to 11C) of the object-side lens 35i and the first inner flange 31c to cause the object-side lens 35i to adhere to the first inner flange 31c. The image-side adhesive 36j is interposed between the peripheral portion of the surface on the image forming side (the side of the solid imaging element 33a) of the object-side lens 35i and the second inner flange 31d to cause the object-side lens 35i to adhere to the second inner flange 31d. Here, the image forming side is the side of an image formed by the lenses 35e and 35f (the right side of FIGS. 11A to 11C).

The object-side adhesive 36i may be a silicone rubber adhesive, if the elastic modulus (Young's modulus, for example) of the silicone rubber adhesive is smaller than that of the object-side lens 35i. The object-side adhesive 36i may be an adhesive other than a silicone rubber adhesive, but its elastic modulus has to be smaller than that of the object-side lens 35i. Since the elastic modulus of the object-side adhesive 36i is smaller than that of the object-side lens 35i, the linear expansion coefficient of the object-side adhesive 36i is larger than that of the object-side lens 35i.

The image-side adhesive 36j may be an epoxy resin adhesive, if the elastic modulus of the epoxy resin adhesive is larger than that of the object-side lens 35i. The image-side adhesives 36j may be an adhesive other than an epoxy resin adhesive, but its elastic modulus has to be larger than that of the object-side lens 35i. Since the elastic modulus of the image-side adhesive 36j is larger than that of the object-side lens 35i, the linear expansion coefficient of the image-side adhesive 36j is smaller than that of the object-side lens 35i.

In this way, the object-side lens 35i is adhered to the first inner flange 31c at its surface on the object side with the object-side adhesive 36i, and adhered to the second inner flange 31d at its surface on the image side (on the side of the solid imaging element 33a) with the image-side adhesive 36j.

For the image-side lens 35b, the adhesive interposed between the peripheral portion of the surface on the object side and the second inner flange 31d and the adhesive interposed between the peripheral portion of the surface on the image side and the third inner flange 31e are the same as each other in material and elastic modulus.

As explained above, the image-side lens 35j is adhered to the second inner flange 31d with the adhesive at the surface on the object side, and adhered to the third inner flange 31e at the surface on the image side with the same adhesive.

Next, the optical characteristics of the object-side lens 35i and the image-side lens 35j are explained. When the focal length of the object-side lens 35i is f1, the focal length of the image-side lens 35j is f2, and the distance between the object-side lens 35i and the image-side lens 35j (referred to as the "inter-lens distance" hereinafter) is d, the focal length f of the lens assembly is given by the following equation.

$$f = f1 \times f2 / (f1 + f2 - d)$$

In this embodiment, the value of f1×f2 is positive. This is because since the object-side lens 35i and the image-side lens 35j are both a convex lens, both the focal lengths f1 and f2 are positive. The relationship of f1×f2>0 always holds within the same operation temperature range as the first embodiment. Further, the value of (f1+f2−d) is always positive within the operation temperature range. Therefore, the focal length f of the lens assembly constituted of the lenses 35i and 35j is positive within the operation temperature range.

The focal point of the lens assembly is adjusted in advance so as to coincides with the position of the solid imaging element 33a when the temperature of the object-side lens 35i and the image-side lens 35j is equal to a predetermined normal temperature T1 (20° C., for example). Here, it is assumed that the inter-lens distance d is d_T1 when the temperature of the lenses 35i and 35j is T1.

When the temperature of the object-side lens 35i and the image-side lens 35j increases from T1, it occurs as follows. In this case, the refractive indices of the lenses 35i and 35j vary with the increase of the temperature to reduce the focal length f of the lens assembly. This is explained below more specifically.

It is assumed that the focal length f of the lens assembly constituted of the lenses 35i and 35j is f_T1 when their temperature is equal to the normal temperature T1, and the focal lengths f1 and f2 are f1_T2 and f2_T2, respectively, when their temperature has increased to a high temperature T2 (100° C., for example). In this case, the relationship of f_T1>f1_T2×f2_T2/(f1_T2+f2_T2−d_T1) holds. Incidentally, since the denominator of the right side of this inequality is equal to the inter-lens distance d at the normal temperature of T1, the value of the right side is different from the focal length f of the lens assembly at the high temperature T2. That is, if the values of the inter-lens distance d at the normal temperature T1 and at the high temperature T2 are the same as each other, the focal length f of the lens assembly becomes shorter as a result of the variation of the refractive indices of the lenses 35i and 35j.

Generally, the refractive index of a lens is roughly a linear function of the temperature within its operation temperature range. Accordingly, the above holds regardless of the value of T2 as long as T2 is within the operation temperature range. When the temperature of the lenses 35i and 35j falls from the normal temperature T1 to a low temperature T3, the opposite to the above holds. T3 may be −40° C., for example.

That is, in this case, the refractive indices of the lenses 35i and 35j vary with the decrease of the temperature to increase the focal length f of the lens assembly. When it is assumed that the focal length f1 is f1_T3 and the focal length f2 is f2_T3 after the temperature of the lenses 35i and 35j has fallen to the low temperature T3, the relationship of f_T1<f1_T3×f3_T3/(f1_T3+f2_T3−d_T1) holds. That is, if the values of the inter-lens distance d at the normal temperature T1 and at the low temperature T3 are the same as each other, the focal length f of the lens assembly becomes longer as a result of variation of the refractive indices of the lenses 35i and 35j.

The variation of the refractive indices and the variation of the focal length as described above are possible for the lens assembly constituted of the lenses 35i and 35j when the following conditions (A), (B) and (C) are satisfied, for example.

(A) The amount of the variation of the refractive index and the amount of the resultant variation of the focal length in the object-side lens 35i are far larger than those in the image-side lens 35j.

(B) The focal length f1 decreases due to variation of the refractive index as the temperature increases, and increases due to variation of the refractive index as the temperature decreases.

(C) The focal length f2 is always larger than the inter-lens distance d within the operation temperature range.

As a resin lens satisfying the condition (B), there is known a lens made of cycloolefin polymer.

Next, variation of the focal length f of the lens assembly constituted of the lenses 35i and 35j with the temperature change is explained in detail. As shown in FIG. 11A, the inter-lens distance d is d_T1 when the lenses 35i and 35j are at the normal temperature T1. As explained in the foregoing, the focal point of the lens assembly coincides with the position of the solid imaging element 33a at this time.

Figure 11B:
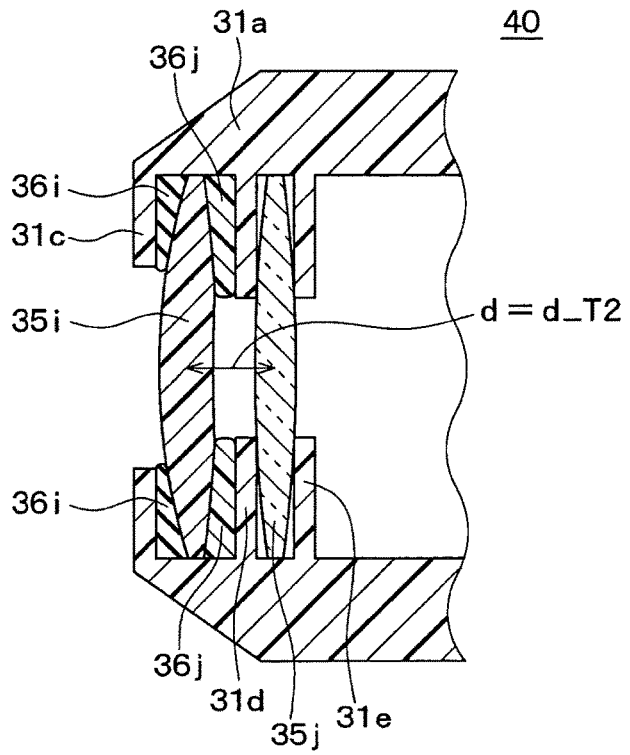
FIG. 11B is an enlarged view of the lens section of the camera module according to the fifth embodiment at the high temperature.

As shown in FIG. 11B, when the temperature of the lens assembly increases to the high temperature T2, the object-side lens 35i is deformed. The elastic modulus of the object-side adhesive 36i is lower than that of the object-side lens 35j. That is, the object-side adhesive 36i is softer than the object-side lens 35i. The elastic modulus of the image-side adhesive 36j is higher than that of the object-side lens 35i. That is, the image-side adhesive 36j is harder than the object-side lens 35i. Accordingly, the amount of deformation due to the temperature increase (thermal expansion) of the object-side lens 35i at the surface in contact with the image-side adhesive 36j and its vicinity is smaller than that at the surface in contact with the object-side adhesive 36j and its vicinity. That is, the object-side lens 35i is deformed more freely at the side of the object-side adhesive 36i than at the side of the image-side adhesive 36j.

As a result, since the object-side lens 35i is warped, the object-side lens 35i moves in the direction for its center portion to distance from the image-side lens 35j. Hence, the inter-lens distance d increases from d_T1 to d_T2. In this way, the inter-lens distance d increases with the increase of the temperature of the lenses 35i and 35j.

Figure 11C:
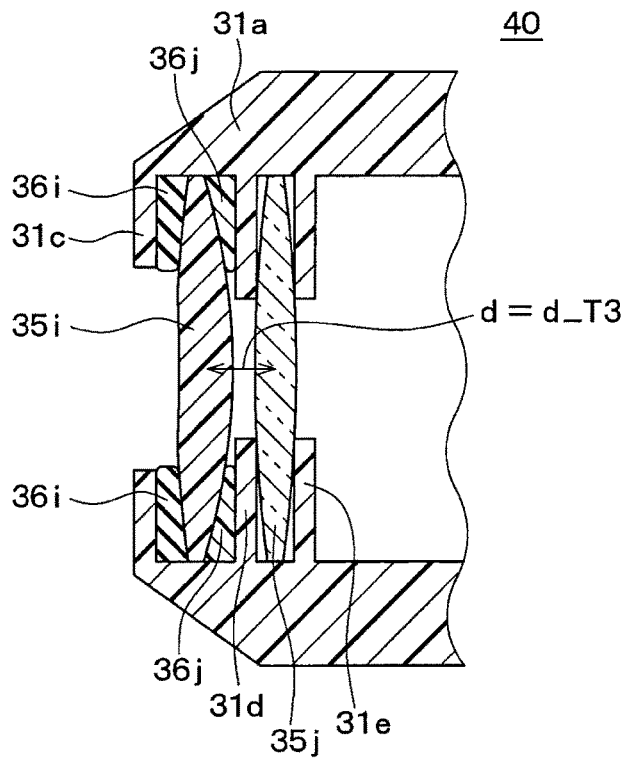
FIG. 11C is an enlarged view of the lens section of the camera module according to the fifth embodiment at the low temperature.

As shown in FIG. 11C, when the temperature of the lenses 35i and 35j decreases from the normal temperature T1 to the low temperature T3, the object-side lens 35i is deformed. The amount of deformation due to the temperature decrease (thermal contraction) of the object-side lens 35i at the surface in contact with the object-side adhesive 36i and its vicinity is larger than that at the surface in contact with the image-side adhesive 36j and its vicinity.

As a result, since the object-side lens 35i is warped, the object-side lens 35i moves in the direction for its center portion to approach the image-side lens 35j. Hence, the inter-lens distance d decreases from d_T1 to d_T3. In this way, the inter-lens distance d decreases with the decrease of the temperature of the lenses 35i and 35j.

For the image-side lens 35j, since there is no difference in characteristic between the adhesive for adhesion to the second inner flange 31d and the adhesive for adhesion to the third inner flange 31e, even if the image-side lens 35j is thermally deformed, it does not substantially contribute to the variation of the inter-lens distance d. When the image-side lens 35j is made of glass, the amount of its deformation due to the temperature change is far smaller than that of the object-side lens 35i made of resin.

As described in the foregoing, the focal distance f of the lens assembly constituted of the lenses 35c and 35d is given by the equation of $f=f1 \times f2/(f1+f2-d)$. In this embodiment, since the numerator and the denominator of the right side are both positive, the focal length f becomes longer with the decrease of the inter-lens distance d. Accordingly, when the inter-lens distance d becomes longer with the increase of the temperature, the focal length f of the lens assembly is caused to increase. On the other hand, when the inter-lens distance d becomes shorter with the decrease of the temperature, the focal length f of the lens assembly is caused to decrease.

As explained above, when the changes of the refractive indices of the lenses 35I and 35J due to the temperature increase causes the focal length f of the lens assembly to decrease, the resultant deformation of the object-side lens 35i causes the focal length f of the lens assembly to increase conversely.

Likewise, when the changes of the refractive indices of the lenses 35i and 35j due to the temperature decrease causes the focal length f of the lens assembly to increase, the resultant deformation of the object-side lens 35i causes the focal length f of the lens assembly to decrease conversely.

That is, the effect of the change of the refractive indices and the effect of the resultant deformation cancel with each other. As a result, the variation of the focal length f of the lens assembly constituted of the lenses 35i and 35j with the temperature increase or decrease can be reduced, and the positional deviation between the focal point of the lens assembly and the position of the solid imaging element 33a can be reduced.

As explained above, the relatively harder adhesive 36j is interposed between the first holder 31 and the surface on the side facing the lens 35j of the lens 35i. Also, the relatively softer adhesive 36i is interposed between the first holder 31 and the surface on the side opposite to the lens 35j of the lens 35i.

By disposing the adhesives 36i and 36j having different elastic moduli on the different sides of the lens 35i, the thermal deformation of the lens 35i can be adjusted, and accordingly the inter-lens distance d can be adjusted. That is, by appropriately determining which of the adhesives 36i and 36j should be disposed on which of the different sides of the lens 35i, it becomes possible that the effect of the change of the refractive indices of the lenses 35i and 35j on the focal length f and the effect of the resultant deformation of the lens 35i on the focal length f cancel with each other, to thereby reduce the variation of the focal length f with the temperature change.

In addition, since the means for compensating the refractive indices of the lenses 35i and 35j is just an adhesive normally used for fixing them, the parts count of the lens module 40 and the imaging apparatus 1 can be prevented from being increased.

Sixth Embodiment

Figure 12A:
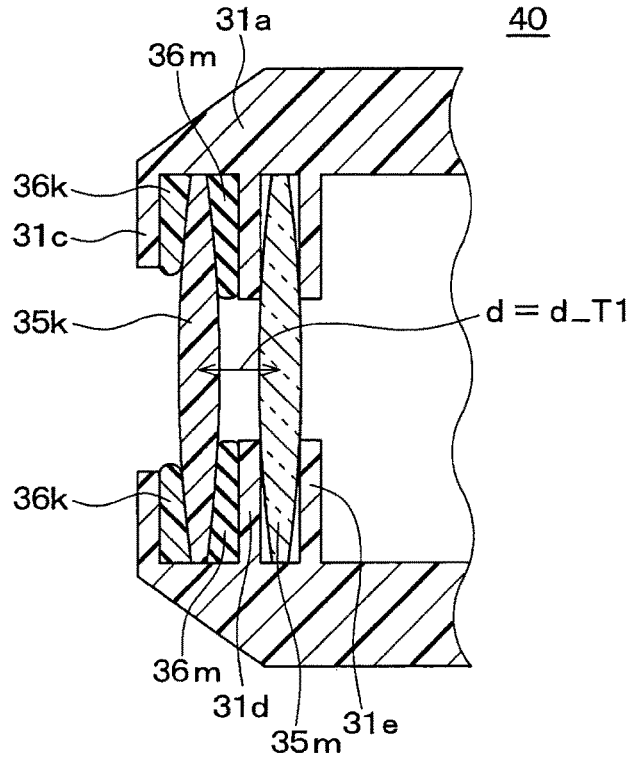
FIG. 12A is an enlarged view of a lens section of a camera module according to a sixth embodiment at the normal temperature.

Next, a sixth embodiment of the invention is described with reference to FIGS. 12A to 12C. The sixth embodiment differs from the first embodiment in that the object-side lens 35a and the image-side lens 35b are replaced by an object-side lens 35k and an image-side lens 35m, respectively, and the object-side adhesive 36a and the image-side adhesive 36b are replaced by an object-side adhesive 36k and an image-side adhesive 36m.

The first holder 31, the object-side lens 35k, the image-side lens 35m, the object-side adhesive 36k and the image-side adhesive 36m constitute a lens module 40. In the sixth embodiment, the object-side lens 35k corresponds to the first lens, the image-side lens 35m corresponds to the second lens, the object-side adhesive 36k corresponds to the first adhesive and the image-side adhesive 36m corresponds to the second adhesive.

In this embodiment, the object-side lens 35k is a lens made of resin, and the image-side lens 35m is a lens made of glass.

These two lenses 35k and 35m constitute a lens assembly. The image-side lens 35m is disposed closer to the image forming side or the side of the solid imaging element 33a than the object-side lens 35k is.

The object-side adhesive 36k is interposed between the peripheral portion of the surface on the object side (the left side in FIGS. 12A to 12C) of the object-side lens 35k and the first inner flange 31c to cause the object-side lens 35k to adhere to the first inner flange 31c. The image-side adhesive 36m is interposed between the peripheral portion of the surface on the image forming side (the side of the solid imaging element 33a) of the object-side lens 35k and the second inner flange 31d to cause the object-side lens 35k to adhere to the second inner flange 31d. Here, the image forming side is the side of an image formed by the lenses 35k and 35m (the right side of FIGS. 12A to 12C).

The object-side adhesive 36k may be an epoxy resin adhesive, if the elastic modulus (Young's modulus, for example) of the epoxy resin adhesive is larger than that of the object-side lens 35k. The object-side adhesives 36k may be an adhesive other than an epoxy resin adhesive, but its elastic modulus has to be larger than that of the object-side lens 35k. Since the elastic modulus of the object-side adhesive 36k is larger than that of the object-side lens 35k, the linear expansion coefficient of the object-side adhesive 36k is smaller than that of the object-side lens 35k.

The image-side adhesive 36m may be a silicone rubber adhesive, if the elastic modulus of the silicone rubber adhesive is smaller than that of the object-side lens 35k. The image-side adhesives 36m may be an adhesive other than a silicone rubber adhesive, but its elastic modulus has to be smaller than that of the object-side lens 35k. Since the elastic modulus of the image-side adhesive 36m is smaller than that of the object-side lens 35k, the linear expansion coefficient of the image-side adhesive 36m is larger than that of the object-side lens 35k.

In this way, the object-side lens 35k is adhered to the first inner flange 31c at its surface on the object side with the object-side adhesive 36k, and adhered to the second inner flange 31d at its surface on the image side (on the side of the solid imaging element 33a) with the image-side adhesive 36m.

For the image-side lens 35m, the adhesive interposed between the peripheral portion of the surface on the object side and the second inner flange 31d and the adhesive interposed between the peripheral portion of the surface on the image side and the third inner flange 31e are the same as each other in material and elastic modulus.

As explained above, the image-side lens 35m is adhered to the second inner flange 31d with the adhesive at the surface on the object side, and adhered to the third inner flange 31e at the surface on the image side with the same adhesive.

Next, the optical characteristics of the object-side lens 35k and the image-side lens 35m are explained. When the focal length of the object-side lens 35k is f1, the focal length of the image-side lens 35m is f2, and the distance between the object-side lens 35k and the image-side lens 35m (referred to as the "inter-lens distance" hereinafter) is d, the focal length f of the lens assembly is given by the following equation.

$$f = f1 \times f2 / (f1 + f2 - d)$$

In this embodiment, the value of f1×f2 is positive. This is because since the object-side lens 35k and the image-side lens 35m are both a convex lens, both the focal lengths f1 and f2 are positive. The relationship of f1×f2>0 always holds within the same operation temperature range as the first embodiment. Further, the value of (f1+f2−d) is always positive within the operation temperature range. Therefore, the focal length f of the lens assembly constituted of the lenses 35k and 35k is positive within the operation temperature range.

The focal point of the lens assembly is adjusted in advance so as to coincide with the position of the solid imaging element 33a when the temperature of the object-side lens 35k and the image-side lens 35m is equal to a predetermined normal temperature T1 (20° C., for example). Here, it is assumed that the inter-lens distance d is d_T1 when the temperature of the lenses 35k and 35m is T1.

When the temperature of the object-side lens 35k and the image-side lens 35m increases from T1, it occurs as follows. In this case, the refractive indices of the lenses 35k and 35m vary with the increase of the temperature to increase the focal length f of the lens assembly. This is explained below more specifically.

It is assumed that the focal length f of the lens assembly constituted of the lenses 35k and 35m is f_T1 when their temperature is equal to the normal temperature T1, and the focal lengths f1 and f2 are f1_T2 and f2_T2, respectively, when their temperature has increased to a high temperature T2 (100° C., for example). In this case, the relationship of f_T1 < f1_T2×f2_T2/(f1_T2+f2_T2−d_T1) holds. Incidentally, since the denominator of the right side of this inequality is equal to the inter-lens distance d at the normal temperature of T1, the value of the right side is different from the focal length f of the lens assembly at the high temperature T2. That is, if the values of the inter-lens distance d at the normal temperature T1 and at the high temperature T2 are the same as each other, the focal length f of the lens assembly becomes longer as a result of variation of the refractive indices of the lenses 35k and 35m.

Generally, the refractive index of a lens is roughly a linear function of the temperature within its operation temperature range. Accordingly, the above holds regardless of the value of T2 as long as T2 is within the operation temperature range. When the temperature of the lenses 35k and 35m falls from the normal temperature T1 to a low temperature T3, the opposite to the above holds. T3 may be −40° C., for example.

That is, in this case, the refractive indices of the lenses 35k and 35m vary with the decrease of the temperature to reduce the focal length f of the lens assembly. When it is assumed that the focal length f1 is f1_T3 and the focal length f2 is f2_T3 after the temperature of the lenses 35k and 35m has fallen to the low temperature T3, the relationship of f_T1>f1_T3×f3_T3/(f1_T3+f2_T3−d_T1) holds. That is, if the values of the inter-lens distance d at the normal temperature T1 and at the low temperature T3 are the same as each other, the focal length f of the lens assembly becomes shorter as a result of the variation of the refractive indices of the lenses 35k and 35m.

The variation of the refractive indices and the variation of the focal length as described above are possible for the lens assembly constituted of the lenses 35k and 35m when the following conditions (A), (B) and (C) are satisfied, for example.

(A) The amount of the variation of the refractive index and the amount of the resultant variation of the focal length in the object-side lens 35k are far larger than those in the image-side lens 35m.

(B) The focal length f1 increases due to variation of the refractive index as the temperature increases, and decreases due to variation of the refractive index as the temperature decreases.

(C) The focal length f2 is always larger than the inter-lens distance d within the operation temperature range.

As a resin lens satisfying the condition (B), there is known a lens made of cycloolefin polymer.

Next, variation of the focal length f of the lens assembly constituted of the lenses 35k and 35m with the temperature change is explained in detail. As shown in FIG. 12A, the inter-lens distance d is d_T1 when the lenses 35k and 35m are at the normal temperature T1. As explained in the foregoing, the focal point of the lens assembly coincides with the position of the solid imaging element 33a at this time.

Figure 12B:
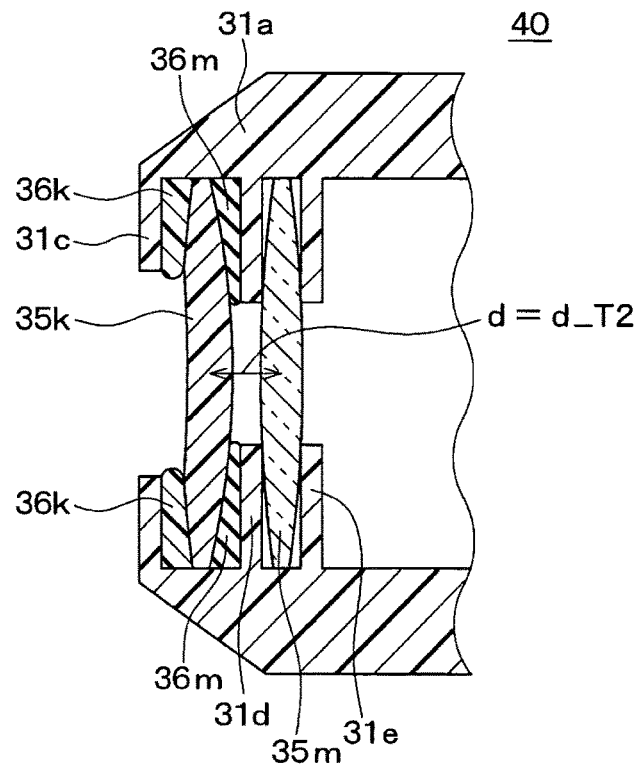
FIG. 12B is an enlarged view of the lens section of the camera module according to the sixth embodiment at the high temperature.

As shown in FIG. 12B, when the temperature of the lens assembly increases to the high temperature T2, the object-side lens 35k is deformed. The elastic modulus of the object-side adhesive 36k is higher than that of the object-side lens 35k. That is, the object-side adhesive 36k is harder than the object-side lens 35k. The elastic modulus of the image-side adhesive 36m is lower than that of the object-side lens 35k. That is, the image-side adhesive 36m is softer than the object-side lens 35k. Accordingly, the amount of deformation due to the temperature increase (thermal expansion) of the object-side lens 35k at the surface in contact with the image-side adhesive 36m and its vicinity is larger than that at the surface in contact with the object-side adhesive 36k and its vicinity. That is, the object-side lens 35k is deformed more freely at the side of the image-side adhesive 36m than at the side of the object-side adhesive 36k.

As a result, since the object-side lens 35k is warped, the object-side lens 35k moves in the direction for its center portion to approach the image-side lens 35m. Hence, the inter-lens distance d decreases from d_T1 to d_T2. In this way, the inter-lens distance d decreases with the increase of the temperature of the lenses 35k and 35m.

As shown in FIG. 12C, when the temperature of the lenses 35k and 35m decreases from the normal temperature T1 to the low temperature T3, the object-side lens 35k is deformed. The amount of deformation due to the temperature decrease (thermal contraction) of the object-side lens 35k at the surface in contact with the object-side adhesive 36k and its vicinity is larger than that at the surface in contact with the image-side adhesive 36m and its vicinity.

As a result, since the object-side lens 35k is warped, the object-side lens 35k moves in the direction for its center portion to distance from the image-side lens 35m. Hence, the inter-lens distance d increases from d_T1 to d_T3. In this way, the inter-lens distance d increases with the decrease of the temperature of the lenses 35k and 35m.

For the image-side lens 35m, since there is no difference in characteristic between the adhesive for adhesion to the second inner flange 31d and the adhesive for adhesion to the third inner flange 31e, even if the image-side lens 35m is thermally deformed, it does not substantially contribute to the variation of the inter-lens distance d. When the image-side lens 35m is made of glass, the amount of its deformation due to the temperature change is far smaller than that of the object-side lens 35k made of resin.

As described in the foregoing, the focal distance f of the lens assembly constituted of the lenses 35k and 35m is given by the equation of $f=f1'f2/(f1+f2-d)$. In this embodiment, since the numerator and the denominator of the right side are both positive, the focal length f becomes longer with the decrease of the inter-lens distance d. Accordingly, when the inter-lens distance d becomes shorter with the increase of the temperature, the focal length f of the lens assembly is caused to decrease. On the other hand, when the inter-lens distance d becomes longer with the decrease of the temperature, the focal length f of the lens assembly is caused to increase.

As explained above, when the changes of the refractive indices of the lenses 35k and 35m due to the temperature increase causes the focal length f of the lens assembly to increase, the resultant deformation of the object-side lens 35k causes the focal length f of the lens assembly to decrease conversely.

Likewise, when the changes of the refractive indices of the lenses 35k and 35m due to the temperature decrease causes the focal length f of the lens assembly to decrease, the resultant deformation of the object-side lens 35k causes the focal length f of the lens assembly to increase conversely.

That is, the effect of the change of the refractive indices and the effect of the resultant deformation cancel with each other. As a result, the variation of the focal length f of the lens assembly constituted of the lenses 35k and 35m with the temperature increase or decrease can be reduced, and the positional deviation between the focal point of the lens assembly and the position of the solid imaging element 33a can be reduced.

As explained above, the relatively harder adhesive 36k is interposed between the first holder 31 and the surface on the side opposite to the lens 35m of the lens 35f. Also, the relatively softer adhesive 36m is interposed between the first holder 31 and the surface on the side facing the lens 35m of the lens 35k.

By disposing the adhesives 36k and 36m having different elastic moduli on the different sides of the lens 35k, the thermal deformation of the lens 35k can be adjusted, and accordingly the inter-lens distance d can be adjusted. That is, by appropriately determining which of the adhesives 36k and 36m should be disposed on which of the different sides of the lens 35k, it becomes possible that the effect of the change of the refractive indices of the lenses 35k and 35m on the focal length f and the effect of the resultant deformation of the lens 35k on the focal length f cancel with each other, to thereby reduce the variation of the focal length f with the temperature change.

In addition, since the means for compensating the refractive indices of the lenses 35k and 35mf is just an adhesive normally used for fixing them, the parts count of the lens module 40 and the imaging apparatus 1 can be prevented from being increased.

Seventh Embodiment

Next, a seventh embodiment of the invention is described with reference to FIGS. 13A to 13C. The seventh embodiment differs from the first embodiment in that the object-side lens 35a and the image-side lens 35b are replaced by an object-side lens 35n and an image-side lens 35p, respectively, and the object-side adhesive 36a and the image-side adhesive 36b are replaced by an object-side adhesive 36n and an image-side adhesive 36p. In the seventh embodiment, the adhesives 36n and 36p are not for the object-side lens 35n but for the image-side lens 35p.

The first holder 31, the object-side lens 35n, the image-side lens 35p, the object-side adhesive 36n and the image-side adhesive 36p constitute a lens module 40. In the seventh embodiment, the object-side lens 35n corresponds to the second lens, the image-side lens 35p corresponds to the first lens, the object-side adhesive 36n corresponds to the first adhesive and the image-side adhesive 36p corresponds to the second adhesive.

In this embodiment, the object-side lens 35n is a lens made of glass, and the image-side lens 35p is a lens made of resin.

These two lenses 35n and 35p constitute a lens assembly. The image-side lens 35p is disposed closer to the image forming side or the side of the solid imaging element 33a than the object-side lens 35n is.

The object-side adhesive 36n is interposed between the peripheral portion of the surface on the object side (the left side in FIGS. 13A to 13C) of the image-side adhesive 36p and the second inner flange 31d to cause the image-side lens 35p to adhere to the second inner flange 31d. The image-side adhesive 36p is interposed between the peripheral portion of the surface on the image forming side (the side of the solid imaging element 33a) of the image-side lens 35p and the third inner flange 31e to cause the image-side lens 35p to adhere to the third inner flange 31e. Here, the image forming side is the side of an image formed by the lenses 35n and 35p (the right side of FIGS. 13A to 13C).

The object-side adhesive 36n may be an epoxy resin adhesive, if the elastic modulus (Young's modulus, for example) of the epoxy resin adhesive is larger than that of the image-side lens 35p. The object-side adhesives 36n may be an adhesive other than an epoxy resin adhesive, but its elastic modulus has to be larger than that of the image-side lens 35p. Since the elastic modulus of the object-side adhesive 36n is larger than that of the image-side lens 35p, the linear expansion coefficient of the object-side adhesive 36n is smaller than that of the image-side lens 35p.

The image-side adhesive 36p may be a silicone rubber adhesive, if the elastic modulus of the silicone rubber adhesive is smaller than that of the image-side lens 35p. The image-side adhesive 36p may be an adhesive other than a silicone rubber adhesive, but its elastic modulus has to be smaller than that of the image-side lens 35p. Since the elastic modulus of the image-side adhesive 36p is smaller than that of the image-side lens 35p, the linear expansion coefficient of the image-side adhesive 36p is smaller than that of the image-side lens 35p.

In this way, the image-side lens 35p is adhered to the second inner flange 31d at its surface on the object side with the object-side adhesive 36n, and adhered to the third inner flange 31e at its surface on the image side (on the side of the solid imaging element 33a) with the image-side adhesive 36p.

For the object-side lens 35n, the adhesive interposed between the peripheral portion of the surface on the object side and the first inner flange 31c and the adhesive interposed between the peripheral portion of the surface on the image side (the side of the solid imaging element 33a) and the second inner flange 31d are the same as each other in material and elastic modulus.

As explained above, the object-side lens 35n is adhered to the first inner flange 31c with the adhesive at the surface on the object side, and adhered to the second inner flange 31d at the surface on the image side with the same adhesive.

Next, the optical characteristics of the object-side lens 35n and the image-side lens 35p are explained. When the focal length of the object-side lens 35n is f1, the focal length of the image-side lens 35p is f2, and the distance between the object-side lens 35n and the image-side lens 35p (referred to as the "inter-lens distance" hereinafter) is d, the focal length f of the lens assembly is given by the following equation.

$$f = f1 \times f2 / (f1 + f2 - d)$$

In this embodiment, the value of f1×f2 is positive. This is because since the object-side lens 35n and the image-side lens 35p are both a convex lens, both the focal lengths f1 and f2 are positive. The relationship of f1×f2>0 always holds within the same operation temperature range as the first embodiment. Further, the value of (f1+f2−d) is always positive within the operation temperature range. Therefore, the focal length f of the lens assembly constituted of the lenses 35n and 35p is positive within the operation temperature range.

The focal point of the lens assembly is adjusted in advance so as to coincides with the position of the solid imaging element 33a when the temperature of the object-side lens 35n and the image-side lens 35p is equal to a predetermined normal temperature T1 (20° C., for example). Here, it is assumed that the inter-lens distance d is d_T1 when the temperature of the lenses 35n and 35p is T1.

When the temperature of the object-side lens 35n and the image-side lens 35p increases from T1, it occurs as follows. In this case, the refractive indices of the lenses 35n and 35p vary with the increase of the temperature to reduce the focal length f of the lens assembly. This is explained below more specifically.

It is assumed that the focal length f of the lens assembly constituted of the lenses 35n and 35p is f_T1 when their temperature is equal to the normal temperature T1, and the focal lengths f and f2 are f1_T2 and f2_T2, respectively, when their temperature has increased to a high temperature T2 (100° C., for example). In this case, the relationship of f_T1>f1_T2×f2_T2/(f1_T2+f2_T2−d_T1) holds. Incidentally, since the denominator of the right side of this inequality is equal to the inter-lens distance d at the normal temperature of T1, the value of the right side is different from the focal length f of the lens assembly at the high temperature T2. That is, if the values of the inter-lens distance d at the normal temperature T1 and at the high temperature T2 are the same as each other, the focal length f of the lens assembly becomes shorter as a result of the variation of the refractive indices of the lenses 35n and 35p.

Generally, the refractive index of a lens is roughly a linear function of the temperature within its operation temperature range. Accordingly, the above holds regardless of the value of T2 as long as T2 is within the operation temperature range. When the temperature of the lenses 35n and 35p falls from the normal temperature T1 to a low temperature T3, the opposite to the above holds. T3 may be −40° C., for example.

That is, in this case, the refractive indices of the lenses 35n and 35p vary with the decrease of the temperature to increase the focal length f of the lens assembly. When it is assumed that the focal length f1 is f1_T3 and the focal length f2 is f2_T3 after the temperature of the lenses 35n and 35p has fallen to the low temperature T3, the relationship of f_T1<f1_T3×f3_T3/(f1_T3+f2_T3−d_T1) holds. That is, if the values of the inter-lens distance d at the normal temperature T1 and at the low temperature T3 are the same as each other, the focal length f of the lens assembly becomes longer as a result of variation of the refractive indices of the lenses 35n and 35p.

The variation of the refractive indices and the variation of the focal length as described above are possible for the lens assembly constituted of the lenses 35n and 35p when the following conditions (A), (B) and (C) are satisfied, for example.

(A) The amount of the variation of the refractive index and the amount of the resultant variation of the focal length in the image-side lens 35p are far larger than those in the object-side lens 35n.

(B) The focal length f2 decreases due to variation of the refractive index as the temperature increases, and increases due to variation of the refractive index as the temperature decreases.

(C) The focal length f1 is always larger than the inter-lens distance d within the operation temperature range.

As a resin lens satisfying the condition (B), there is known a lens made of cycloolefin polymer.

Next, variation of the focal length f of the lens assembly constituted of the lenses 35n and 35p with the temperature change is explained in detail. As shown in FIG. 13A, the inter-lens distance d is d_T1 when the lenses 35n and 35p are at the normal temperature T1. As explained in the foregoing, the focal point of the lens assembly coincides with the position of the solid imaging element 33a at this time.

Figure 13B:
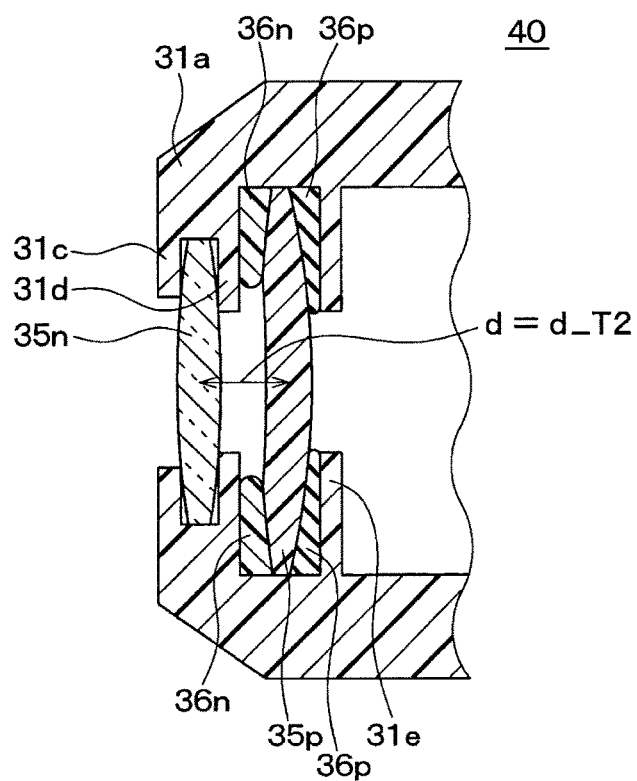
FIG. 13B is an enlarged view of the lens section of the camera module according to the seventh embodiment at the high temperature.

As shown in FIG. 13B, when the temperature of the lens assembly increases to the high temperature T2, the image-side lens 35p is deformed. The elastic modulus of the object-side adhesive 36n is higher than that of the image-side lens 35p. That is, the object-side adhesive 36n is harder than the image-side lens 35p. The elastic modulus of the image-side adhesive 36p is lower than that of the image-side lens 35p. That is, the image-side adhesive 36p is softer than the object-side lens 35p. Accordingly, the amount of deformation due to the temperature increase (thermal expansion) of the image-side lens 35p at the surface in contact with the object-side adhesive 36n and its vicinity is larger than that at the surface in contact with the image-side adhesive 36p and its vicinity. That is, the image-side lens 35p is deformed more freely at the side of the image-side adhesive 36p than at the side of the object-side adhesive 36n.

As a result, since the image-side lens 35n is warped, the image-side lens 35n moves in the direction for its center portion to distance from the object-side lens 35n. Hence, the inter-lens distance d increases from d_T1 to d_T2. In this way, the inter-lens distance d increases with the increase of the temperature of the lenses 35n and 35p.

Figure 13C:
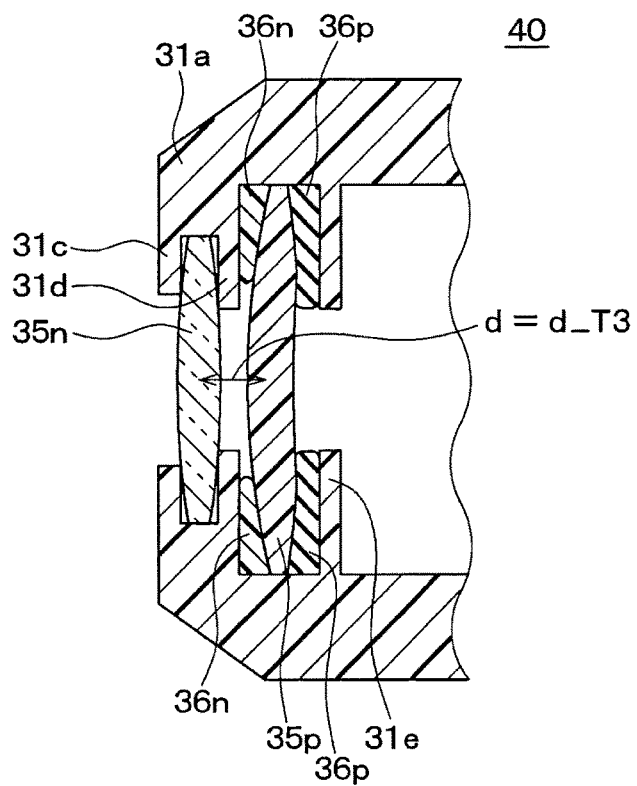
FIG. 13C is an enlarged view of the lens section of the camera module according to the seventh embodiment at the low temperature.

As shown in FIG. 13C, when the temperature of the lenses 35n and 35p decreases from the normal temperature T1 to the low temperature T3, the image-side lens 35p is deformed. The amount of deformation due to the temperature decrease (thermal contraction) of the image-side lens 35p at the surface in contact with the object-side adhesive 36n and its vicinity is smaller than that at the surface in contact with the image-side adhesive 36p and its vicinity.

As a result, since the image-side lens 35p is warped, the image-side lens 35p moves in the direction for its center portion to approach the object-side lens 35n. Hence, the inter-lens distance d decreases from d_T1 to d_T3. In this way, the inter-lens distance d decreases with the decrease of the temperature of the lenses 35n and 35p.

For the object-side lens 35n, since there is no difference in characteristic between the adhesive for adhesion to the first inner flange 31c and the adhesive for adhesion to the second inner flange 31d, even if the object-side lens 35n is thermally deformed, it does not substantially contribute to the variation of the inter-lens distance d. When the object-side lens 35n is made of glass, the amount of its deformation due to the temperature change is far smaller than that of the image-side lens 35p made of resin.

As described in the foregoing, the focal distance f of the lens assembly constituted of the lenses 35n and 35p is given by the equation of $f = f1 \times f2/(f1+f2-d)$. In this embodiment, since the numerator and the denominator of the right side are both positive, the focal length f decreases with the decrease of the inter-lens distance d. Accordingly, when the inter-lens distance d becomes longer with the increase of the temperature, the focal length f of the lens assembly is caused to increase. On the other hand, when the inter-lens distance d becomes shorter with the decrease of the temperature, the focal length f of the lens assembly is caused to decrease.

As explained above, when the changes of the refractive indices of the lenses 35n and 35p due to the temperature increase causes the focal length f of the lens assembly to decrease, the resultant deformation of the image-side lens 35p causes the focal length f of the lens assembly to increase conversely.

Likewise, when the changes of the refractive indices of the lenses 35n and 35p due to the temperature decrease causes the focal length f of the lens assembly to increase, the resultant deformation of the image-side lens 35p causes the focal length f of the lens assembly to decrease conversely.

That is, the effect of the change of the refractive indices and the effect of the resultant deformation cancel with each other. As a result, the variation of the focal length f of the lens assembly constituted of the lenses 35n and 35p with the temperature increase or decrease can be reduced, and the positional deviation between the focal point of the lens assembly and the position of the solid imaging element 33a can be reduced.

As explained above, the relatively harder adhesive 36p is interposed between the first holder 31 and the surface on the side facing the lens 35n of the lens 35p. Also, the relatively softer adhesive 36p is interposed between the first holder 31 and the surface on the side opposite to the lens 35n of the lens 35p.

By disposing the adhesives 36n and 36p having different elastic moduli on the different sides of the lens 35p, the thermal deformation of the lens 35p can be adjusted, and accordingly the inter-lens distance d can be adjusted. That is, by appropriately determining which of the adhesives 36n and 36p should be disposed on which of the different sides of the lens 35pi, it becomes possible that the effect of the change of the refractive indices of the lenses 35n and 35q on the focal length f and the effect of the resultant deformation of the lens 35p on the focal length f cancel with each other, to thereby reduce the variation of the focal length f with the temperature change.

In addition, since the means for compensating the refractive indices of the lenses 35n and 35p is just an adhesive normally used for fixing them, the parts count of the lens module 40 and the imaging apparatus 1 can be prevented from being increased.

Eighth Embodiment

Figure 14A:
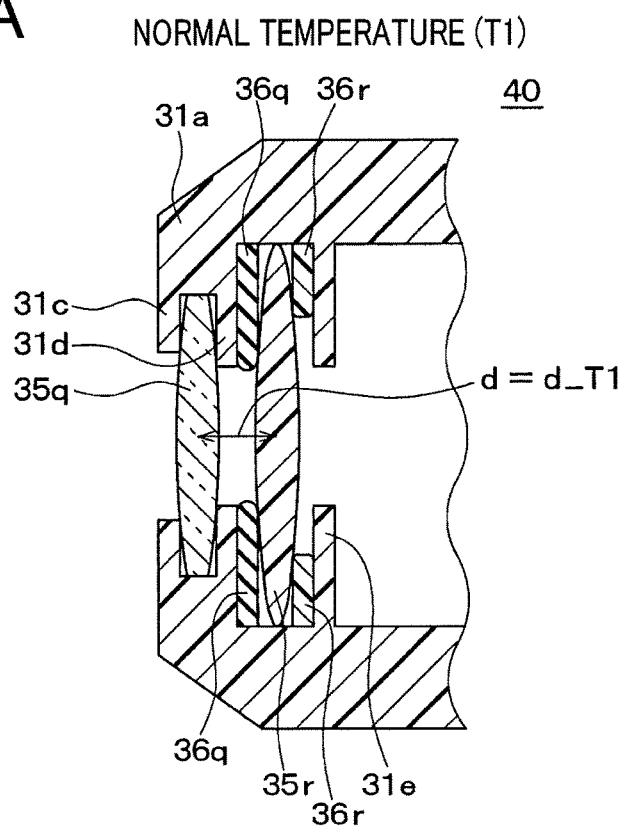
FIG. 14A is an enlarged view of a lens section of a camera module according to an eighth embodiment at the normal temperature.

Next, an eighth embodiment of the invention is described with reference to FIGS. 14A to 14C. The eighth embodiment differs from the first embodiment in that the object-side lens 35a and the image-side lens 35b are replaced by an object-side lens 35q and an image-side lens 35r, respectively, and the object-side adhesive 36a and the image-side adhesive 36b are replaced by an object-side adhesive 36q and an image-side adhesive 36r. In the eighth embodiment, the adhesives 36q and 36r are not for the object-side lens 35q but for the image-side lens 35r.

The first holder 31, the object-side lens 35q, the image-side lens 35r, the object-side adhesive 36q and the image-side adhesive 36r constitute a lens module 40. In the eighth embodiment, the object-side lens 35q corresponds to the second lens, the image-side lens 35r corresponds to the first lens, the object-side adhesive 36q corresponds to the second adhesive and the image-side adhesive 36r corresponds to the first adhesive.

In this embodiment, the object-side lens 35q is a lens made of glass, and the image-side lens 35r is a lens made of resin.

These two lenses 35q and 35r constitute a lens assembly. The image-side lens 35r is disposed closer to the image forming side or the side of the solid imaging element 33a than the object-side lens 35q is.

The object-side adhesive 36q is interposed between the peripheral portion of the surface on the object side (the left side in FIGS. 14A to 14C) of the image-side adhesive 36r and the second inner flange 31d to cause the image-side lens 35r to adhere to the second inner flange 31d. The image-side adhesive 36r is interposed between the peripheral portion of the surface on the image forming side (the side of the solid imaging element 33a) of the image-side lens 35r and the third inner flange 31e to cause the image-side lens 35r to adhere to the third inner flange 31e. Here, the image forming side is the side of an image formed by the lenses 35q and 35r (the right side of FIGS. 14A to 14C).

The object-side adhesive 36q may be a silicone rubber adhesive, if the elastic modulus (Young's modulus, for example) of the silicone rubber adhesive is smaller than that of the image-side lens 35r. The object-side adhesive 36q may be an adhesive other than a silicone rubber adhesive, but its elastic modulus has to be smaller than that of the image-side lens 35r. Since the elastic modulus of the object-side adhesive 36q is smaller than that of the image-side lens 35r, the linear expansion coefficient of the object-side adhesive 36q is larger than that of the image-side lens 35q.

The image-side adhesive 36r may be an epoxy resin adhesive, if the elastic modulus of the epoxy resin adhesive is larger than that of the image-side lens 35r. The image-side adhesives 36r may be an adhesive other than an epoxy resin adhesive, but its elastic modulus has to be larger than that of the image-side lens 35r. Since the elastic modulus of the image-side adhesive 36r is larger than that of the image-side lens 35r, the linear expansion coefficient of the image-side adhesive 36r is smaller than that of the image-side lens 35r.

In this way, the image-side lens 35r is adhered to the second inner flange 31d at its surface on the object side with the object-side adhesive 36q, and adhered to the third inner flange 31e at its surface on the image side (on the side of the solid imaging element 33a) with the image-side adhesive 36r.

For the object-side lens 35q, the adhesive interposed between the peripheral portion of the surface on the object side and the first inner flange 31c and the adhesive interposed between the peripheral portion of the surface on the image side (the side of the solid imaging element 33a) and the second inner flange 31d are the same as each other in material and elastic modulus.

As explained above, the object-side lens 35q is adhered to the first inner flange 31c with the adhesive at the surface on the object side, and adhered to the second inner flange 31d at the surface on the image side with the same adhesive.

Next, the optical characteristics of the object-side lens 35q and the image-side lens 35r are explained. When the focal length of the object-side lens 35q is f1, the focal length of the image-side lens 35r is f2, and the distance between the object-side lens 35q and the image-side lens 35r (referred to as the "inter-lens distance" hereinafter) is d, the focal length f of the lens assembly is given by the following equation.

$$f = f1 \times f2 / (f1 + f2 - d)$$

In this embodiment, the value of f1×f2 is positive. This is because since the object-side lens 35q and the image-side lens 35r are both a convex lens, both the focal lengths f1 and f2 are positive. The relationship of f1×f2>0 always holds within the same operation temperature range as the first embodiment. Further, the value of (f1+f2−d) is always positive within the operation temperature range. Therefore, the focal length f of the lens assembly constituted of the lenses 35q and 35r is positive within the operation temperature range.

The focal point of the lens assembly is adjusted in advance so as to coincide with the position of the solid imaging element 33a when the temperature of the object-side lens 35q and the image-side lens 35r is equal to a predetermined normal temperature T1 (20° C., for example). Here, it is assumed that the inter-lens distance d is d_T1 when the temperature of the lenses 35q and 35r is T1.

When the temperature of the object-side lens 35q and the image-side lens 35r increases from T1, it occurs as follows. In this case, the refractive indices of the lenses 35q and 35r vary with the increase of the temperature to increase the focal length f of the lens assembly. This is explained below more specifically.

It is assumed that the focal length f of the lens assembly constituted of the lenses 35q and 35r is f_T1 when their temperature is equal to the normal temperature T1, and the focal lengths f1 and f2 are f1_T2 and f2_T2, respectively, when their temperature has increased to a high temperature T2 (100° C., for example). In this case, the relationship of f_T1<f1_T2×f2_T2/(f1_T2+f2_T2−d_T1) holds. Incidentally, since the denominator of the right side of this inequality is equal to the inter-lens distance d at the normal temperature of T1, the value of the right side is different from the focal length f of the lens assembly at the high temperature T2. That is, if the values of the inter-lens distance d at the normal temperature T1 and at the high temperature T2 are the same as each other, the focal length f of the lens assembly becomes longer as a result of variation of the refractive indices of the lenses 35q and 35r.

Generally, the refractive index of a lens is roughly a linear function of the temperature within its operation temperature range. Accordingly, the above holds regardless of the value of T2 as long as T2 is within the operation temperature range. When the temperature of the lenses 35q and 35r falls from the normal temperature T1 to a low temperature T3, the opposite to the above holds. T3 may be −40° C., for example.

That is, in this case, the refractive indices of the lenses 35q and 35r vary with the decrease of the temperature to reduce the focal length f of the lens assembly. When it is assumed that the focal length f1 is f1_T3 and the focal length f2 is f2_T3 after the temperature of the lenses 35n and 35p has fallen to the low temperature T3, the relationship of f_T1>f1_T3×f3_T3/(f1_T3+f2_T3−d_T1) holds. That is, if the values of the inter-lens distance d at the normal temperature T1 and at the low temperature T3 are the same as each other, the focal length f of the lens assembly becomes shorter as a result of the variation of the refractive indices of the lenses 35q and 35r.

The variation of the refractive indices and the variation of the focal length as described above are possible for the lens assembly constituted of the lenses 35q and 35r when the following conditions (A), (B) and (C) are satisfied, for example.

(A) The amount of the variation of the refractive index and the amount of the resultant variation of the focal length in the image-side lens 35r are far larger than those in the object-side lens 35q.

(B) The focal length f2 increases due to variation of the refractive index as the temperature increases, and decreases due to variation of the refractive index as the temperature decreases.

(C) The focal length f1 is always larger than the inter-lens distance d within the operation temperature range.

As a resin lens satisfying the condition (B), there is known a lens made of cycloolefin polymer.

Next, variation of the focal length f of the lens assembly constituted of the lenses 35q and 35r with the temperature change is explained in detail. As shown in FIG. 14A, the inter-lens distance d is d_T1 when the lenses 35q and 35r are at the normal temperature T1. As explained in the foregoing, the focal point of the lens assembly coincides with the position of the solid imaging element 33a at this time.

Figure 14B:
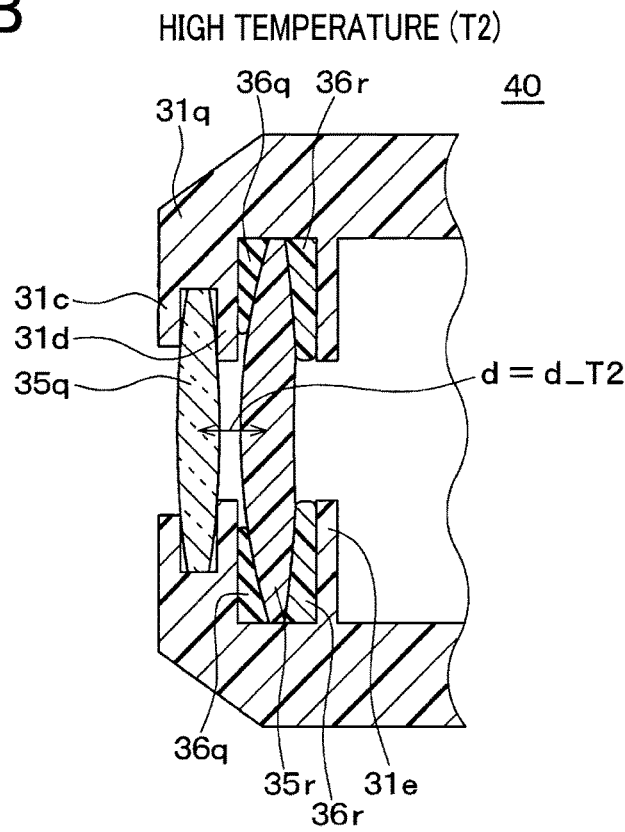
FIG. 14B is an enlarged view of the lens section of the camera module according to the eighth embodiment at the high temperature.

As shown in FIG. 14B, when the temperature of the lens assembly increases to the high temperature T2, the image-side lens 35r is deformed. The elastic modulus of the object-side adhesive 36q is lower than that of the image-side lens 35r. That is, the object-side adhesive 36q is softer than the image-side lens 35r. The elastic modulus of the image-side adhesive 36r is higher than that of the image-side lens 35r. That is, the image-side adhesive 36r is harder than the image-side lens 35r. Accordingly, the amount of deformation due to the temperature increase (thermal expansion) of the image-side lens 35r at the surface in contact with the image-side adhesive 36r and its vicinity is smaller than that at the surface in contact with the object-side adhesive 36q and its vicinity. That is, the image-side lens 35r is deformed more freely at the side of the object-side adhesive 36q than at the side of the image-side adhesive 36r.

As a result, since the image-side lens 35r is warped, the image-side lens 35r moves in the direction for its center portion to approach the object-side lens 35q. Hence, the inter-lens distance d decreases from d_T1 to d_T2. In this way, the inter-lens distance d decreases with the increase of the temperature of the lenses 35q and 35r.

Figure 14C:
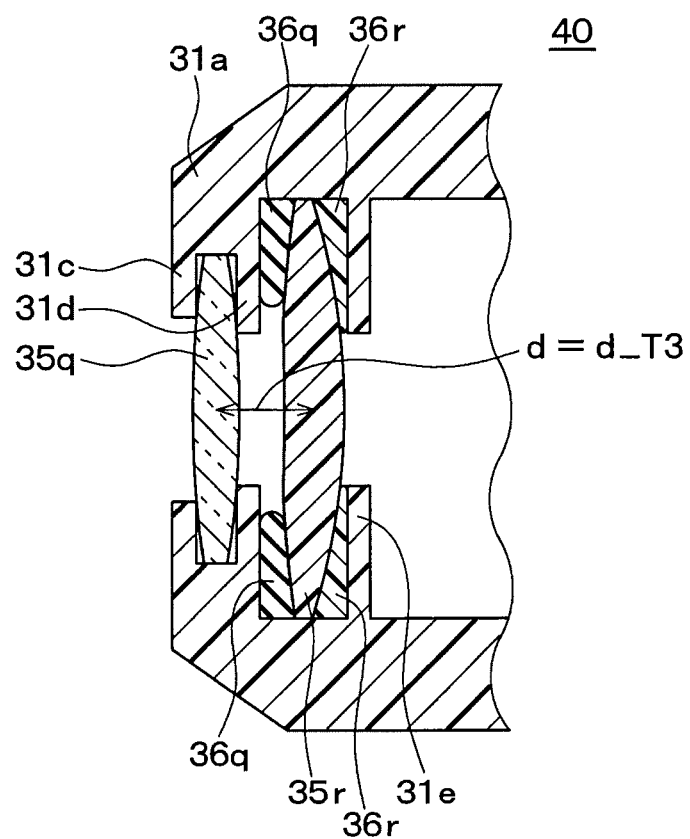
FIG. 14C is an enlarged view of the lens section of the camera module according to the eighth embodiment at the low temperature.

As shown in FIG. 14C, when the temperature of the lenses 35q and 35r decreases from the normal temperature T1 to the low temperature T3, the image-side lens 35r is deformed. The amount of deformation due to the temperature decrease (thermal contraction) of the image-side lens 35r at the surface in contact with the object-side adhesive 36q and its vicinity is larger than that at the surface in contact with the image-side adhesive 36r and its vicinity.

As a result, since the image-side lens 35r is warped, the image-side lens 35r moves in the direction for its center portion to distance from the object-side lens 35q. Hence, the inter-lens distance d increases from d_T1 to d_T3. In this way, the inter-lens distance d increases with the decrease of the temperature of the lenses 35q and 35r.

For the object-side lens 35q, since there is no difference in characteristic between the adhesive for adhesion to the first inner flange 31c and the adhesive for adhesion to the second inner flange 31d, even if the object-side lens 35q is thermally deformed, it does not substantially contribute to the variation of the inter-lens distance d. When the object-side lens 35q is made of glass, the amount of its deformation due to the temperature change is far smaller than that of the image-side lens 35r made of resin.

As described in the foregoing, the focal distance f of the lens assembly constituted of the lenses 35q and 35r is given by the equation of $f = f1 \times f2/(f1+f2-d)$. In this embodiment, since the numerator and the denominator of the right side are both positive, the focal length f decreases with the decrease of the inter-lens distance d. Accordingly, when the inter-lens distance d becomes shorter with the increase of the temperature, the focal length f of the lens assembly is caused to decrease. On the other hand, when the inter-lens distance d becomes longer with the decrease of the temperature, the focal length f of the lens assembly is caused to increase.

As explained above, when the changes of the refractive indices of the lenses 35q and 35r due to the temperature increase causes the focal length f of the lens assembly to increase, the resultant deformation of the image-side lens 35r causes the focal length f of the lens assembly to decrease conversely.

Likewise, when the changes of the refractive indices of the lenses 35q and 35r due to the temperature decrease causes the focal length f of the lens assembly to decrease, the resultant deformation of the image-side lens 35r causes the focal length f of the lens assembly to increase conversely.

That is, the effect of the change of the refractive indices and the effect of the resultant deformation cancel with each other. As a result, the variation of the focal length f of the lens assembly constituted of the lenses 35q and 35r with the temperature increase or decrease can be reduced, and the positional deviation between the focal point of the lens assembly and the position of the solid imaging element 33a can be reduced.

As explained above, the relatively harder adhesive 36r is interposed between the first holder 31 and the surface on the side opposite to the lens 35p of the lens 35r. Also, the relatively softer adhesive 36q is interposed between the first holder 31 and the surface on the side facing the lens 35q of the lens 35r.

By disposing the adhesives 36q and 36r having different elastic moduli on the different sides of the lens 35r, the thermal deformation of the lens 35r can be adjusted, and accordingly the inter-lens distance d can be adjusted. That is, by appropriately determining which of the adhesives 36q and 36r should be disposed on which of the different sides of the lens 35r, it becomes possible that the effect of the change of the refractive indices of the lenses 35q and 35r on the focal length f and the effect of the resultant deformation of the lens 35r on the focal length f cancel with each other, to thereby reduce the variation of the focal length f with the temperature change.

In addition, since the means for compensating the refractive indices of the lenses 35q and 35r is just an adhesive normally used for fixing them, the parts count of the lens module 40 and the imaging apparatus 1 can be prevented from being increased.

The characteristics of the first to eighths embodiment are summarized in FIG. 15. In FIG. 15, there are shown the shape of the object-side lens, the shape of the image-side lens, the effects on the focal length f by the change of the refractive indices due to the temperature increase, the sign of the value of (f1+f2−d), the change of the inter-lens distance d due to the temperature increase, and a harder one of the two different adhesives for each of the first to eighth embodiments. In FIG. 15, the words "(DEFORMATION)" in the columns of OBJECT-SIDEL LENS or IMAGE-SIDE LENS means that the lens in the column is a lens which is deformed intentionally using the difference in elastic modulus between the two different adhesives.

As shown in FIG. 15, it is determined whether the inter-lend distance d should increase or decrease when the temperature increases and the harder adhesive should be disposed on the object side or the image side in accordance with whether the change of the refractive indices of the lenses causes the absolute value of focal length f to increase or decrease, and whether the sign of the value of (f1+f2−d) is positive or negative.

Other Embodiments

It is a matter of course that various modifications can be made to the above embodiments as described below.

One or more of the above embodiments can be combined if the combination is not apparently impossible or is not apparently inappropriate. In each of the above embodiments, all the parts or elements does not necessary have to be indispensable constituent elements.

The invention is not limited to the number of the parts or elements, numerical values, amounts or ranges described in each of the above embodiments. Also, the invention is not limited to any specific shapes or positional relationships of the parts or elements described in the above embodiments.

The following modifications 1 and 2 can be applied to the above embodiments.

Modification 1

In each of the above embodiments, the object-side lens and the image-side lens may be positionally reversed. For example, in the first embodiment, the lens 35b may be disposed more to the object side than the lens 35a is. However, in this case, also the object-side adhesive and the image-side adhesive have to be reversed positionally. For example, the adhesive 36b is interposed between the first holder 31 and the surface on the object side of the lens 35a, and the adhesive 36a is interposed between the first holder 31 and the surface on the image side of the lens 35a. Also in this configuration, the similar advantages to those provided by the first to eighth embodiments can be provided.

Modification 2

In each of the first to eighths embodiments, the focal length f of the lens assembly constituted of the first lens and the second lens is positive, and the first lens is adhered to the holder with the first and second adhesives, the first adhesive being larger in elastic modulus than the first lens, the second adhesive being smaller in elastic modulus than the first lens.

However, the present invention is applicable to a case where the focal length is negative. In this case, the first adhesive is interposed between one surface of the first lens and the holder, and the second adhesive is interposed between the other surface of the first lens and the holder so that the effect of the change of the refractive indices of the first and second lenses due to the temperature change of the lens assembly on the focal length f of the lens assembly, and the effect of the resultant deformation of the first lens on the focal length f of the lens assembly cancel with each other.

What is claimed is:

1. A lens module for an imaging apparatus comprising:
a lens assembly including a first lens and a second lens, the first lens having a first major surface and a second major surface opposed to the first major surface through a thickness of the first lens;
a holder holding the lens assembly;
a first adhesive that adheres the first lens to the holder, an elastic modulus of the first adhesive being larger than an elastic modulus of the first lens; and
a second adhesive that adheres the first lens to the holder, an elastic modulus of the second adhesive being smaller than the elastic modulus of the first lens; wherein
the first adhesive is interposed between the first major surface of the first lens and the holder, and the second adhesive is interposed between the second major surface of the first lens and the holder, such that effect of a change of refractive indices of the first and second lenses due to change of temperature of the lens assembly on a focal length of the lens assembly, and effect of deformation of the first lens due to the change of the temperature of the lens assembly on the focal length of the lens assembly cancel with each other.

2. The lens module for an imaging apparatus according to claim 1, wherein
a product of a focal length of the first lens and a focal length of the second lens is negative,
a sum of the focal length of the first lens and the focal length of the second lens is smaller than a distance between the first lens and the second lens,
a change of the refractive indices of the first and second lenses due to increase of the temperature of the lens assembly causes the focal length of the lens assembly to increase,
the first adhesive is interposed between the holder and the surface on a side facing the second lens of the first lens to adhere the first lens to the holder,
the second adhesive is interposed between the holder and the surface on a side opposite to the second lens of the first lens to adhere the first lens to the holder, and
the distance between the first lens and the second lens is caused to increase due to increase of the temperature of the lens assembly to thereby increase the focal length of the lens assembly.

3. The lens module for an imaging apparatus according to claim 1, wherein
a product of a focal length of the first lens and a focal length of the second lens is positive,
a sum of the focal length of the first lens and the focal length of the second lens is larger than a distance between the first lens and the second lens,
a change of the refractive indices of the first and second lenses due to increase of the temperature of the lens assembly causes the focal length of the lens assembly to decrease,
the first adhesive is interposed between the holder and the surface on a side facing the second lens of the first lens to adhere the first lens to the holder,
the second adhesive is interposed between the holder and the surface on a side opposite to the second lens of the first lens to adhere the first lens to the holder, and
the distance between the first lens and the second lens is caused to increase due to increase of the temperature of the lens assembly to thereby increase the focal length of the lens assembly.

4. The lens module for an imaging apparatus according to claim 1, wherein
a product of a focal length of the first lens and a focal length of the second lens is positive,
a sum of the focal length of the first lens and the focal length of the second lens is larger than a distance between the first lens and the second lens,
a change of the refractive indices of the first and second lenses due to increase of the temperature of the lens assembly causes the focal length of the lens assembly to increase,
the first adhesive is interposed between the holder and the surface on a side opposite to the second lens of the first lens to adhere the first lens to the holder,
the second adhesive is interposed between the holder and the surface on a side facing the second lens of the first lens to adhere the first lens to the holder, and
the distance between the first lens and the second lens is caused to increase due to increase of the temperature of the lens assembly to thereby decrease the focal length of the lens assembly.

5. A lens module for an imaging apparatus comprising:
a lens assembly including a first lens and a second lens;
a holder holding the lens assembly;
a first adhesive that adheres the first lens to the holder, an elastic modulus of the first adhesive being larger than an elastic modulus of the first lens; and a second adhesive that adheres the first lens to the holder, an elastic modulus of the second adhesive being smaller than the elastic modulus of the first lens; wherein the first adhesive is interposed between one surface of the first lens and the holder, and the second adhesive is interposed between the other surface of the first lens and the holder, such that effect of a change of refractive indices of the first and second lenses due to change of temperature of the lens assembly on a focal length of the lens assembly, and effect of deformation of the first lens due to the change of the temperature of the lens assembly on the focal length of the lens assembly cancel with each other;

a product of a focal length of the first lens and a focal length of the second lens is negative, a sum of the focal length of the first lens and the focal length of the second lens is smaller than a distance between the first lens and the second lens, a change of the refractive indices of the first and second lenses due to increase of the temperature of the lens assembly causes the focal length of the lens assembly to decrease, the first adhesive is interposed between the holder and the surface on a side opposite to the second lens of the first lens to adhere the first lens to the holder, the second adhesive is interposed between the holder and the surface on a side facing the second lens of the first lens to adhere the first lens to the holder, and the distance between the first lens and the second lens is caused to decrease due to increase of the temperature of the lens assembly to thereby increase the focal length of the lens assembly.

6. A lens module for an imaging apparatus comprising:

a lens assembly including a first lens and a second lens;

a holder holding the lens assembly;

a first adhesive that adheres the first lens to the holder, an elastic modulus of the first adhesive being larger than an elastic modulus of the first lens; and a second adhesive that adheres the first lens to the holder, an elastic modulus of the second adhesive being smaller than the elastic modulus of the first lens, wherein the first adhesive is interposed between one surface of the first lens and the holder, and the second adhesive is interposed between the other surface of the first lens and the holder, such that effect of a change of refractive indices of the first and second lenses due to change of temperature of the lens assembly on a focal length of the lens assembly, and effect of deformation of the first lens due to the change of the temperature of the lens assembly on the focal length of the lens assembly cancel with each other, a product of a focal length of the first lens and a focal length of the second lens is negative, a sum of the focal length of the first lens and the focal length of the second lens is smaller than a distance between the first lens and the second lens, the first adhesive is interposed between the holder and the surface on a side opposite to the second lens of the first lens to adhere the first lens to the holder, and the second adhesive is interposed between the holder and the surface on a side facing the second lens of the first lens to adhere the first lens to the holder.

\* \* \* \* \*